United States Patent
Hankin et al.

(10) Patent No.: US 6,912,520 B2
(45) Date of Patent: Jun. 28, 2005

(54) SYSTEM AND METHOD FOR PROVIDING A PERSISTENT OBJECT FRAMEWORK FOR MANAGING PERSISTENT OBJECTS

(75) Inventors: Keith Hankin, Palo Alto, CA (US); Ching-Wen Alan Chu, Santa Clara, CA (US); Nirupama Mallavarupu, Santa Clara, CA (US); James Kong, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 538 days.

(21) Appl. No.: 09/940,580

(22) Filed: Aug. 29, 2001

(65) Prior Publication Data

US 2003/0163439 A1 Aug. 28, 2003

(51) Int. Cl.[7] ............................................... G06F 17/30
(52) U.S. Cl. .............................. 707/1; 707/4; 707/10; 707/103 R; 707/200; 709/220; 709/229; 719/315; 719/316
(58) Field of Search ............................. 707/4, 10, 200, 707/103 R, 1–3, 6, 102, 101, 104.1, 203; 709/220, 229, 216, 203, 219, 222; 719/315, 316; 711/100, 118, 159, 160

(56) References Cited

U.S. PATENT DOCUMENTS

| | | | | |
|---|---|---|---|---|
| 5,765,162 A | * | 6/1998 | Blackman et al. | 707/103 R |
| 5,787,280 A | * | 7/1998 | Joseph et al. | 707/203 |
| 6,035,303 A | * | 3/2000 | Baer et al. | 707/103 R |
| 6,052,528 A | * | 4/2000 | Dechamboux | 717/116 |
| 6,065,013 A | * | 5/2000 | Fuh et al. | 707/103 R |
| 6,356,946 B1 | * | 3/2002 | Clegg et al. | 709/231 |
| 6,453,321 B1 | * | 9/2002 | Hill et al. | 707/103 Y |
| 6,615,204 B1 | * | 9/2003 | Menon | 707/3 |
| 6,615,219 B1 | * | 9/2003 | Bruso et al. | 707/102 |
| 2002/0147857 A1 | * | 10/2002 | Sanchez et al. | 709/316 |

OTHER PUBLICATIONS

Fotouni et al.: Complex objects in the temporal object system, May 19992, IEEE, pp. 381–384.*

Malcolm et al.: Types and persistence in database programming languages, Jun. 1987, ACM computing Serveys, vol. 19, p. 105–170.*

Jorge F. et al.: Transaction management in an object-oriented database system, 1988, ACM Press, pp. 37–45.*

Rafiul Ahad: A framework to support an object-oriented view of existing engineering database, 1988, ACM Press, pp. 167–175.*

SQL, Techencyclopedia, http://www.techweb.com/encyclopedia/printDefinition?term=SQL, May 18, 2001, pp. 1–2.

Windows SDK, Techencyclopedia, http://www.techweb.com/encyclopedia/printDefinition?term=Windows%20SDK, May 18, 2001, p. 1.

IPlanet, Techencyclopedia, http://www.techweb.com/encyclopedia/printDefinition?term=iPlanet, May 18, 2001, p. 1.

(Continued)

Primary Examiner—Charles Rones
Assistant Examiner—Jacques Veillard
(74) Attorney, Agent, or Firm—Kent A. Lembke; William J. Kubida; Hogan & Hartson LLP

(57) ABSTRACT

A system and method for managing persistent objects with a persistent object framework is disclosed. The persistent object framework receives queries and instructions from an application for data from the persistent objects. The persistent objects are stored in data sources, such as databases or repositories. The persistent object framework may create, save, update, access, search, and delete persistent objects. Further, the persistent object framework caches applicable persistent objects for the application. The persistent object framework provides the caching for the persistent objects. The persistent object framework supports both Lightweight Directory Access Protocol and relational databases.

27 Claims, 9 Drawing Sheets-

OTHER PUBLICATIONS

IPlanet Application Server, Techencyclopedia, http://www.techweb.com/encyclopedia/printDefinition?term=iPlanet%20Application%Serve, May 18, 2001, p. 1.

Java platform, Techencyclopedia, http://www.techweb.com/encyclopedia/printDefinition?term=Java%20platform, May 18, 2001, p. 1.

Persistent object, Techencyclopedia, http://www.techweb.com/encyclopedia/printDefinition?term=persistent%20object, May 18, 2001, p. 1.

Java application, Techencyclopedia, http://www.techweb.com/encyclopedia/printDefinition?term=Java%20application, May 18, 2001, p. 1.

LDAP, Techencyclopedia, http://www.techweb.com/encyclopedia/printDefinition?term=LDAP, May 18, 2001, p. 1.

* cited by examiner

SYSTEM AND METHOD FOR PROVIDING A PERSISTENT OBJECT FRAMEWORK FOR MANAGING PERSISTENT OBJECTS

BACKGROUND OF THE INVENTION

1. Field of the Invention

The present invention relates to a system and method for managing objects that are stored persistently. More particularly, the present invention relates to managing persistently stored objects within databases that are accessible by applications.

2. Discussion of the Related Art

A persistent object may be defined as an abstraction of data that represents an object that may be involved in a business process and is stored persistently. Examples of persistent objects include orders, customers, products and the like. Persistent objects may be stored in different types of persistent storage, such as relational databases, object-oriented databases, Lightweight Directory Access Protocol ("LDAP") enabled directories, flat files, and the like. In persistent object environments, the term "data source" may refer to persistent storage so as to be applicable to all forms of persistent storage. For example, "data source" may indicate a database.

In addition to being stored, persistent objects may be managed. An application programming interface ("API") may create, update, delete, and query the objects that are stored persistently. Managing persistent objects may become a priority as programs are written for any platform, such as Java applications. The application may look for the persistent objects or may create persistent objects to be used after the program has been completed. Therefore, a framework for persistent object API may be desired that is uniform and simple.

SUMMARY OF THE INVENTION

Accordingly, the embodiments of present invention are directed to a system and method for providing a persistent object framework for managing persistent objects.

According to an embodiment, a system for managing persistent objects for an application is disclosed. The persistent objects are stored in at least one data source. The system includes a persistent object framework to provide data from and perform functions on the persistent objects in accordance with the application. The system also includes a cached set of persistent objects within the persistent object framework and corresponding to the stored persistent objects.

According to another embodiment, an application system supported by a Java programming environment is disclosed. The application system includes a relational database storing a first set of persistent objects correlating to the application. The application system also includes a LDAP repository storing a second set of persistent objects correlating to the application. The application system also includes a persistent object framework to provide data to the application from the first and second sets of persistent objects. The persistent object framework caches a subset of the persistent objects from the relational and the LDAP repository.

According to another embodiment, a method for managing persistent objects correlating to an application is disclosed. The method includes mapping a persistent object stored within a data source with a persistent object framework coupled to the application. The method also includes identifying the persistent object stored in the data source as applicable to the application. The method also includes caching the persistent object within the persistent object framework.

According to another embodiment, a method for searching persistent objects stored in at least one data source is disclosed. An application accesses the persistent objects for data. The method includes receiving a search query for a persistent object at a persistent object framework. The method also includes determining a query type for the search query. The method also includes searching a cache within the persistent object framework for the persistent object. The method also includes searching the data source when the persistent object is not within the cache.

According to another embodiment, a method for managing persistent objects stored in at least one data source according to relationships between the persistent objects is disclosed. An application accesses the persistent objects for data. The method includes specifying a relationship between at least two objects. The method also includes retrieving the at least two objects according to the relationship. The method also includes performing a function on the relationship. The method also includes synchronizing another relationship between the at least two objects according to the result of the function.

According to another embodiment, a method for resolving a stale data state between a persistent object and an application accessing the persistent object for data is disclosed. The method also includes executing a process of the application accessing the persistent object. The persistent object includes a revision attribute. The method includes identifying the stale data state within the persistent object by a persistent object framework. The method also includes retrying the process of the application accessing the persistent object. The method also includes incrementing the revision attribute.

According to another embodiment, a method for managing persistent objects within an application system is disclosed. The persistent objects are stored within a first data source and a second data source. The persistent objects provide data to an application. The method includes implementing a persistent object framework that caches the persistent objects correlating to the application by creating the persistent objects, caching the persistent objects, accessing the persistent objects, updating the persistent objects, searching the persistent objects, deferring writes to the first and second data sources, and controlling persistent storage of the persistent objects. The method also includes retrieving the data from the first and second data sources when requested by the persistent object framework.

According to another embodiment, a system for managing persistent objects correlating to an application is disclosed. The system includes means for mapping a persistent object stored within a data source with a persistent object framework coupled to the application. The system also includes means for identifying the persistent object stored in the data source as applicable to the application. The system also includes means for caching the persistent object within the persistent object framework.

According to another embodiment, a computer program product comprising a computer useable medium having computer readable code embodied therein for managing persistent objects correlating to an application is disclosed. The computer program product is adapted to run on a computer to effect steps, including mapping a persistent object stored within a data source with a persistent object framework coupled to the application. The steps also include identifying the persistent object stored in the data source as applicable to the application. The steps also include caching the persistent object within the persistent object framework.

According to another embodiment, a system for searching persistent objects stored in at least one data source is disclosed. An application accesses the persistent objects for data. The system includes means for receiving a search query for a persistent object at a persistent object framework. The system also includes means for determining a query type for the search query. The system also includes means for searching a cache within the persistent object framework for the persistent object according to the query type. The system also includes means for searching the data source when the persistent object is not within the cache.

According to another embodiment, a computer program product comprising a computer useable medium having computer readable code embodied therein for searching persistent objects stored in at least one data source is disclosed. An application accesses the persistent objects for data. The computer program product is adapted to run on a computer to effect steps, including receiving a search query for a persistent object at a persistent object framework. The steps also include determining a query type for the search query. The steps also include searching a cache within the persistent object framework for the persistent object according to the query type. The steps also include searching the data source when the persistent object is not within the cache.

According to another embodiment, a system for managing persistent objects stored in at least one data source according to relationships between the persistent objects is disclosed. An application accesses the persistent objects for data. The system includes means for specifying a relationship between at least two objects. The system includes means for retrieving the two objects according to the relationship. The system includes means for performing a function on the relationship. The system includes means for synchronizing another relationship between the two objects according to the result of the function.

According to another embodiment, a computer program product comprising a computer useable medium having computer readable code embodied therein for managing persistent objects stored in at least one data source according to relationships between the persistent objects is disclosed. An application accesses the persistent objects for data. The computer program product is adapted to run on a computer to effect steps, including specifying a relationship between at least two objects. The steps also include retrieving the two objects according to the relationship. The steps also include performing a function on the relationship. The steps also include synchronizing another relationship between the two objects according to the result of the function.

According to another embodiment, a system for resolving a stale data state between a persistent object and an application accessing the persistent object for data is disclosed. The persistent object includes a revision attribute. The system also includes means for retrying the process of the application accessing the persistent object. The system includes means for identifying the stale data state within the persistent object by a persistent object framework. The system also includes means for executing a process of the application accessing the persistent object. The system also includes means for incrementing the revision attribute.

According to another embodiment, a computer program product comprising a computer useable medium having computer readable code embodied therein for resolving a stale data state between a persistent object and an application accessing the persistent object for data is disclosed. The computer program product is adapted to run on a computer to effect steps, including executing a first process of the application accessing the persistent object. The persistent object includes a revision attribute. The steps identifying the stale data state within the persistent object by a persistent object framework also include and incrementing the revision attribute. The steps also include retrying the process of the application accessing the persistent object. The steps also include incrementing the revision attribute.

According to another embodiment, a system for managing persistent objects within an application system is disclosed. The persistent objects are stored within a first data source and a second data source and the persistent objects provide data to an application. The system includes means for implementing a persistent object framework that caches the persistent objects correlating to the application comprising means for creating the persistent objects, means for caching the persistent objects, means for accessing the persistent objects, means for updating the persistent objects, means for searching the persistent objects, means for deferring writes to the first and second data sources, and means for controlling persistent storage of the persistent objects. The system also includes means for retrieving the data from the first and second data sources when requested by the persistent object framework.

According to another embodiment, a computer program product comprising a computer useable medium having computer readable code embodied therein for managing persistent objects within an application system is disclosed. The persistent objects are stored within a first data source and a second data source and the persistent objects provide data to an application. The computer program product is adapted to run on a computer to effect steps, including implementing a persistent object framework that caches the persistent objects correlating to the application comprising creating the persistent objects, caching the persistent objects, accessing the persistent objects, updating the persistent objects, searching the persistent objects, deferring writes to the first and second data sources, and controlling persistent storage of the persistent objects. The steps also include retrieving the data from the first and second data sources when requested by the persistent object framework.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate the disclosed embodiments and together with the description serve to explain the principles of the invention. In the drawings.

DETAILED DESCRIPTION OF THE PREFERRED EMBODIMENTS

Figure 1:
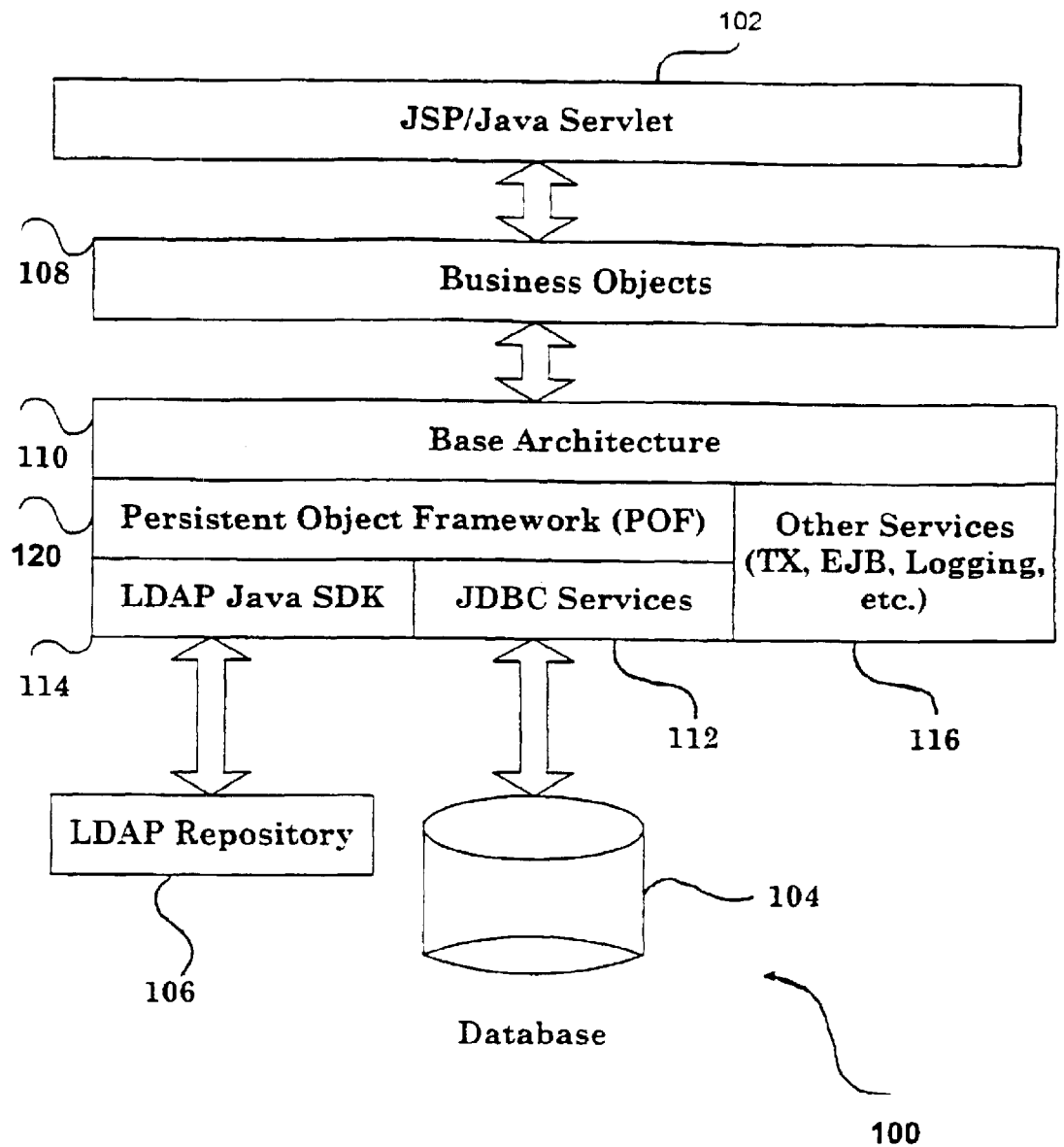
FIG. 1 illustrates a block diagram of a software application system in accordance with an embodiment of the present invention.

Reference will now be made in detail to the preferred embodiment of the present invention, examples of which are illustrated in the drawings.

Embodiments of the present invention include a persistent object framework that provides access to persistent objects in the form of a network of inter-relations that may appear to the application developer as memory resident. This feature may minimize the need for application developers to perform certain tasks. These tasks may include managing persistent object transactions, managing data source connections, composing query statements, mapping of query results to persistent objects and mapping back for data source inserts, updates, and deletes, and the like.

FIG. 1 depicts a system 100 for executing a software application in accordance with an embodiment of the present invention. System 100 may execute a program application on a platform, such as a computer. Preferably, system 100 includes a Java application 102 supported by a database 104 and a LDAP repository 106. Java application 102 may be a Java program or a software application. Java application 102 may run on all hardware platforms, preferably without modification. Java application 102 may be a Java program that contains source code that is compiled into bytecode. Bytecode may be an intermediate language that should run standing alone. The bytecode may be converted, or interpreted, into machine code when Java application 102 is launched. A Java interpreter, or Java Virtual Machine, is invoked. The Java Virtual Machine translates the bytecode into machine code and runs the program. Java application 102 may be Java servlet that is Java code running on the server side. Alternatively, Java application 102 may be a Java applet that is Java code down loaded and running on a client's computer by request.

Database 104 may be colocated with a web server. Database 104 may be a relational database, object-oriented database, and the like. Database 104 may store persistent objects. LDAP repository 106 may be a LDAP-enabled directory that stores persistent objects. Additional storage components, such as flat files, may be coupled to system 100 and accessible by Java application 102. The storage components should store persistent objects. Database 104 and LDAP repository 106 also may be known as data sources.

Java application 102 may use business objects 108 in executing. Business objects 108 may be those objects used in electronic commerce applications, such as buyer, seller, product, and the like. Business objects 108 may be stored within database 104 and LDAP repository 106. Business objects 108 also may be stored within additional data sources accessible by Java application 102.

Base architecture 110 includes those components that function to connect the storage components to Java application 102. Base architecture 110 includes application-server-Java-database-connectivity services 112, LDAP Java Software Development Kit ("SDK") 114, and other application server services 116. A SDK provides APIs, programming framework and the like for developers to use. LDAP Java SDK 114 provides the means to access the data in LDAP repository 106. Other application server services 116 may include logging, TX, EJB, and the like. Java-database-connectivity ("JDBC") services 112 provide an interface with database 104. LDAP Java SDK 114 provides an interface with LDAP repository 106.

Base architecture 110 also includes persistent object framework ("POF") 120. POF 120 provides a uniform, simple application program interface for creating, updating, deleting and querying the persistently stored objects. POF 120 may provide transparent mapping of objects between memory, and database 104 and LDAP repository 106. POF 120 may provide features such as object relationships, concurrency protection, caching, deferred writing, and the like.

Figure 2:
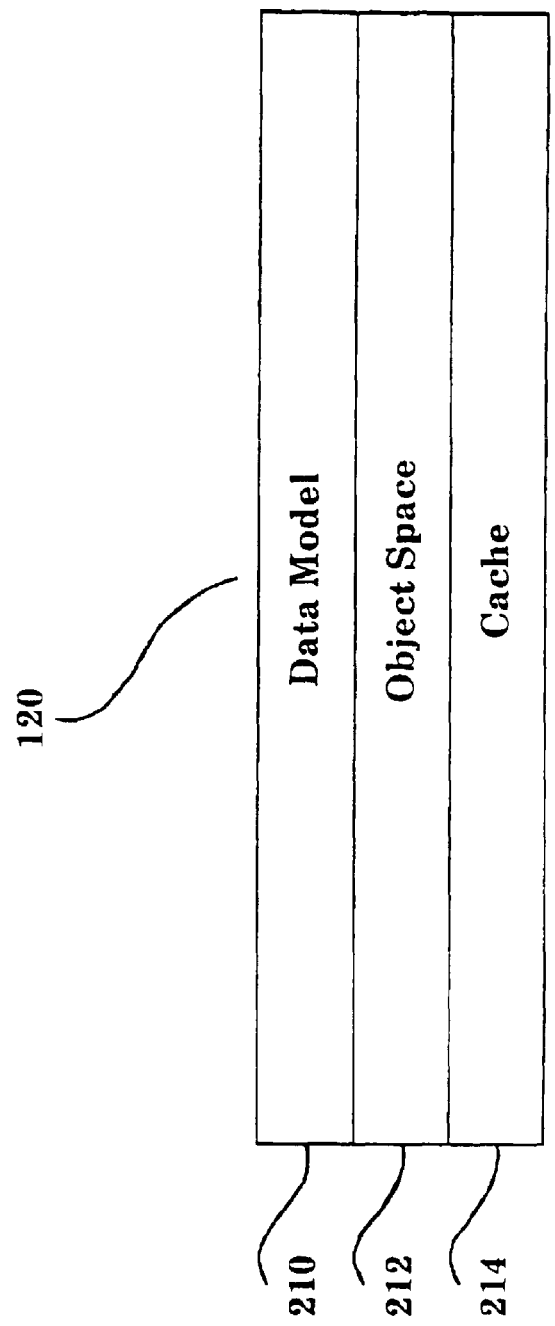
FIG. 2 illustrates a persistent object framework in accordance with an embodiment of the present invention.

FIG. 2 depicts a persistent object framework in accordance with an embodiment of the present invention. FIG. 2 depicts some of the POF components in order to illustrate embodiments of the present invention. FIG. 2, however, should not be considered as illustrating all POF functionalities. POF 120 may be comprised of data model files and persistent object configuration files. POF 120 may perform operations dynamically based upon a data model 210. Data model 210 may be one of a plurality of data models identified by POF 120. The data model 210 may be loaded at runtime initialization. For example, whenever a request to create a new object of type "Order" is received, the newly-created object may be initialized dynamically by examining the definition of the "Order" object type in terms of the attributes that an "Order" should contain. Alternatively, code generation may be implemented to generate an initialization method to improve the performance of object creation.

The data model 210 may specify the types of persistent objects available for use by applications, such as Java application 102. The data model 210 also may specify how each persistent object type maps to data source schemas. Each schema may represent a database table for persistent objects that are to be stored in database 104. Each schema may represent an LDAP schema for persistent objects that are to be stored in LDAP repository 106. The data model 210 may be specified in a file, and formatted as disclosed by the following example:

Data Model Name-Type-Valve ("NTV") File Format

DataModel: =NTV {<DataElementStanza> [<SchemaStanza>][<ObjectTypeStanza>] [<RelationshipStanza>]}

DataElementStanza: ="$data_{13}$ elements" NTV {"defaults" NTV {<DataElements>}}

DataElements: ="<name>" NTV {"datatype" Str "<DataType>", }[,<DataElements>]

DataType: = String|Integer|Long|Boolean|BigDecimal|Date

SchemaStanza:="schema_elements" NTV {"schema" NTV {<Schemas>}}

Schemas: ="<name>" NTV {"schema_type" Str "<SchemaType>", "attributes" NTV

{<SchemaAttributes>}, ["table_name" Str "<jdbcTableName>",]["object_class_name" Str "<ldapObjectClassName>",]["initial_values" NTV {<LDAPSchemaAttrInitialValues>},]}[,<Schemas>]

LDAPSchemaAttrInitialValues: ="<ldapAttrName>" <StringOrStringArray>[,<LDAPSchemaAttrInitialValues>]

StringOrStringArray: =Str "<initialValue>"|StrArr [<initialStringValues>]

SchemaType: =jdbc|ldap

SchemaAttributes: ="<name>" NTV {"data_element" Str "<dataElementName>", ["column_name" Str "<jdbcColumnName>",]["attr_name" Str "<ldapAttrName>",]["dn_attribute" Bool "<Boolean>",]["dn_first_attr" Bool "<Boolean>",] ["required" Bool "<Boolean>",]["primary_key" Bool "<Boolean>",]["sequence" Str "<dbSequenceName>",]["rev_attribute" Bool "<Boolean>",]}[, <SchemaAttributes]

ObjectTypeStanza: ="data_objects" NTV {<ObjectTypes>}

ObjectTypes: ="<tag>" NTV {"class_name" Str "<name>", ["attributes" NTV {<ObjectAttributes>},] ["transient_attributes" NTV {<ObjectTransientAttributes>},]["custom_props" NTV {<CustomProperties>},]["type_tag_attr" Str "<typeTagAttrName>",]["type_tag_value" <NTVDataType> "<typeTagAttrValue>",]["inherits" StrArr [<objectTypeNames>],]}[,<ObjectTypes>]

CustomProperties: ="<propertyName>" <NTVDataType> "<property Value>"[,<CustomProperties>]

ObjectAttributes: ="<tag>" NTV {"attr_name" Str "<name>", "schemas" NTV Arr [<ObjectAttrSchemas>], ["default_value" <NTVDataType> "<defaultValue>",] ["custom_props" NTV {<CustomProperties>},]["guid" Bool "<Boolean>",]}[,<ObjectAttributes>]

ObjectTransientAttributes: ="<tag>" NTV {"attr_name" Str "<name>", ["datatype" Str "<DataType>",] ["default_value" <NTVDataType> "<defaultValue>",] ["custom_props" NTV {<CustomProperties>},]}[, <ObjectTransientAttributes>]

NTVDataType: =Str|Int|Long|Bool|Dec|Date

ObjectAttrSchemas: ={"schema" Str "<schemaName>", "schema_attr" Str "<schemaAttrName>"}[, <ObjectAttrSchemas>]

RelationshipStanza: ="relationships" NTV {<Relationships>}

Relationships: ="<name>" NTV {"source" NTV {<RelationshipRole>}, "target" NTV {<RelationshipRole>}, }[,<Relationships>]

RelationshipRole: ="cardinality" Str "<Cardinality>", ["access_name" Str "<accessName>",]["custom_props" NTV {<CustomProperties>},]<RoleReferenceTypeSpecificInfo>

RoleReferenceTypeSpecificInfo: =<ReferencingByForeignKey>|<ReferencedByForeignKey>|<ReferencingByTagPlusForeignKey> |<ReferencedByTagPlusForeignKey>|<ReferencingBy Handle> |<ReferencedByHandle>|<AssocReference>

ReferencingByForeignKey: ="data_object" Str "<objectTypeName>", "common_attribute" StrArr [<CommonAttributes>], ["foreign_key" Bool "<Boolean>",]

ReferencedByForeignKey: ="data_object" Str "<objectTypeName>", "common_attribute" StrArr [<CommonAttributes>], ReferencingByTagPlusForeignKey: ="data_object" Str "<objectTypeName>", "rel_type_tag_attr" Str "<relTypeTagAttrName>", "rel_data_objects" NTV {<TagRelObjectTypes>}, ReferencedByTagPlusForeignKey: ="data_objects" NTV {<FKObjectTypes>}, ReferencingByHandle: ="data_object" Str "<objectTypeName>", "rel_obj_handle_attr" Str "<relObjHandleAttrName>", ReferencedByHandle: ="data_objects" NTV {<ObjectTypes>}, AssocReference: ="assoc_rel" Str "<relationship Name>", "assoc_role" Str "<SourceOrTarget>", SourceOrTarget: =source|target CommonAttributes: ="objectAttributeName" [,<CommonAttributes>]

Cardinality: =0 ... 1|1 ... 1|0 ... n|1 ... n

TagRelObjectTypes: ="<relObjectTypeName>" NTV {"rel_type_tag_value" <NTVDataType> "<relTypeTagAttrValue>", "common_attribute" StrArr [<CommonAttributes>], }[,<TagRelObjectTypes>]

FKObjectTypes: ="<objectTypeName>" NTV {"common_attribute" StrArr [<CommonAttributes>], }[,<FKObjectTypes>]

ObjectTypes: ="<objectTypeName>" NTV { }[,<ObjectTypes>]

Boolean: =true|false

POF 120 also includes an object space 212 to specify a mapping between persistent object types and the data sources into which they are to be stored, such as database 104 and LDAP repository 106. Preferably, the disclosed embodiments may allow for one data source to be specified per schema type. Thus, one data source may be specified for JDBC and another for LDAP. Every JDBC data source that is specified in object space 212 may be registered with the LDAP server that is used by the Java service to lookup the data source. The object space 212 may be specified in a file, and formatted as disclosed by the following example:

Object Space NTV Format

ObjectSpace: ="object_space" NTV {"data_sources" NTV {<OSDataSources>},

OSDataSources: ="<dataSourceName>" NTV {["root_dn" Str "<ldapRootDN>",]},

The data source may be formatted as disclosed by the following example:

Data Source NTV Format

DataSources: ="data_sources" NTV {<DataSourceStanzas>}

DataSourceStanzas: ="<name>" NTV {"type" Str "<DataSourceType>", "data_source" Str "<dataSourceName>", ["user_name" Str "<jdbcUserName>",]["password" Str "<jdbcPassword>",]["port" Int "<ldapPort>",]}[, <DataSourceStanzas>]

DataSourceType: =jdbc|ldap

Persistent objects are dynamic such that to define a new persistent object type, one edits the files described above: data model, object space and data source. Any changes to the persistent objects, or defined new persistent object types, are available immediately for use without any compilation.

As noted above, data model 210 may include a value for data type. The data type specified by data model 210 may include:

| Data Type | Java Data Type | Oracle Database Data Type |
|---|---|---|
| Str | String | VARCHAR2(<maxCharLength>) |
| Int* | Integer | NUMBER(10) |
| Long** | Long | NUMBER(19) |
| Bool | Boolean | NUMBER(1) |
| Dec | BigDecimal | NUMBER(<maxDigitsLeftOfDecimal>, <maxDigitsRightOfDecimal>) |
| Date | Date | DATE |

*The Int data type may be used for attributes that are designated in the schema as "rev_attribute" Bool "true".

** The Long data type may be used for attributes that are designated in the schema as 'sequence' generated.

Attributes also may be defined by data model 210. An attribute may be a field within a record stored within a data source. Methods may be given to retrieve and to set the attribute values. The attribute values may be retrieved or set as their native types, or in a type-independent way using the method disclosed in the pseudo-code example given below:

```
void
sampleMethod(CXPObject order, CXPObject order2)
    throws CXException
{
    String code, desc;
    BigDecimal grossQty;
    CXPObject buyerCo;
    Collection lines;
// Get a couple of string values.
code = order.getStr("code");
desc = order.getStr("description");
// Copy the value of "grossQuantity" from one order to another order.
order2.setValue("grossQuantity", order.getValue("grossQuantity"));
    // Checking for null value
    if (order.getValue("description") == null)
        System.out.println("No description");
    // Setting null value
    order.setValue("description", null);
    // Another way to set null value
    order.setStr("description", null);
    // Increment the order's grossQuantity by 10.
    grossQty = order.getDec("grossQuantity");
    grossQty = grossQty.add(10.0);
    order.setDec("grossQuantity", grossQty);
    // Assuming that the 'id' attribute is the primary key for the order,
    // the following statement will throw an exception,
    // since the primary key attribute values cannot be changed.
    order.setLong("id", 1234);
}
```

POF 120 may specify that an attribute have its value generated automatically as a globally unique identifier ("GUID"). The GUID may be globally unique such that no other GUID may have the same value. The GUID may be a string, and the attribute to store the GUID also may be declared a string. An example of a declaration in the data object section of data model 210 depicting how to declare an attribute as having its value generated automatically as a GUID is given by the following pseudo-code:

```
"User" NTV {
    "class_name" Str "User",
    "attributes" NTV {
        "id" NTV {
            "schemas" NTVArr [
                {"schema" Str "User", "schema_attr" Str "id"
            } // datatype must be String
            ],
            "guid" Bool "true", // Indicates that this is a 'GUID'-
generated attribute
        },
        // Add other attributes here...
    },
},
```

Alternatively, POF 120 also may specify that an attribute have its value generated automatically as a unique sequence value. The value may be unique for all attributes that use the same sequence name. The sequence value is a "long" and, therefore, the attribute also may be declared a "long." An example depicting how to declare an attribute as having its value generated automatically from a sequence is given by the following pseudo-code:

```
"Order" NTV {
    "schema_type" Str "jdbc",
    "table_name" Str "Order",
    "attributes" NTV {
        "id" NTV {
            "data_element" Str "Long", // This *must* be 'Long'
            "column_name" Str "id",
            "required" Bool "true",
            "sequence" Str "Order_seq", // Indicates that
value is generated
                                         // from the
'Order_seq' sequence.
        },
        // Add other schema attributes here...
    },
}
```

Data model 210 also may define relationships. A relationship may express a link between two persistent objects. Relationships may be defined in terms of two roles where each role represents one of the two related objects. For example, a relationship named "Purchase" may be composed of the following roles:

| Role Name | Object Type(s) | Cardinality |
|---|---|---|
| buyer | Company or Person | 1..1 |
| orders | Order | 0..n |

Each role in a relationship may define a cardinality that indicates the number of objects allowed to be in the relationship. Singular cardinality roles may be those that have a value of "0 . . . 1" or "1 . . . 1." A cardinality of "0 . . . 1" may indicate that for every object of one role in the relationship, there is either zero or one related object of this role. A cardinality of "1 . . . 1" may indicate that for every object of one role in the relationship, there may be only one related object of this role.

Multiple cardinality roles may be those that have a value of "0 . . . n" or "1 . . . n." A cardinality of "0 . . . n" may indicate that for every object of one role in the relationship, there may be any number of related objects of this role. A cardinality of "1 . . . n" may indicate that for every object of one role in the relationship, there may be at least one related object of this role.

According to the disclosed embodiments, the mechanism for defining relationships between persistent objects may be flexible and allows for different ways of specifying how the relationships are represented. Developers may access relationships in a representation-independent manner, and may not have to be aware of how the relationships are represented. Two categories may exist for relationships, reference-based and association-based.

A reference-based relationship may be a relationship wherein the objects of one role contain attribute values that reference the objects of another role. Reference-based relationships may be specified in data model 210 by the examples disclosed below.

A reference-based relationship using reference-by-foreign key may be shown in the following example pseudo-code:

```
"data_objects" NTV {
    "Foo" NTV {
        "attributes" NTV {
            "id" NTV {
                ...
            },
            "barID" NTV {
                ...
            },
        },
    },
    "Bar" NTV {
        "attributes" NTV {
            "id" NTV {
                ...
            },
        },
    },
},
"relationships" NTV {
    "FooBar" NTV {
        "source" NTV {
            "data_object" Str "Foo",
            "access_name" Str "bar",
            "cardinality" Str "0..1",
            "foreign_key" Bool "true",
            "common_attribute" StrArr [ "barID" ],
        },
        "target" NTV {
            "data_object" Str "Bar",
            "access_name" Str "foo",
            "cardinality" Str "0..1",
            "common_attribute" StrArr [ "id" ],
        },
    },
},
```

A reference-based relationship using reference-by-type-tag-plus-foreign key may be shown in the following example pseudo-code:

```
"data_objects" NTV {
    "Foo" NTV {
        "attributes" NTV {
            "barType" NTV {
            },
            "barID" NTV {
                ...
            },
            "barID2" NTV {
                ...
            },
        },
    },
    "TypeA" NTV {
        "attributes" NTV {
            "id" NTV {
                ...
```

-continued

```
        },
    },
},
"TypeB" NTV {
    "attributes" NTV {
        "id" NTV {
            ...
        },
        "id2" NTV {
            ...
        },
    },
},
},
"relationships" NTV {
    "FooBar" NTV {
        "source" NTV {
            "data_object" Str "Foo",
            "access_name" Str "bar",
            "cardinality" Str "0..1",
            "rel_type_tag_attr" Str "barType",
            "rel_data_objects" NTV {
                "TypeA" NTV {
                    "rel_type_tag_value" Str "TypeATag",
                    "common_attribute" StrArr [ "barID" ],
                },
                "TypeB" NTV {
                    "rel_type_tag_value" Str "TypeBTag",
                    "common_attribute" StrArr [ "barID",
"barID2" ],
                },
            },
        },
        "target" NTV {
            "access_name" Str "foo",
            "cardinality" Str "0..1",
            "data_objects" NTV {
                "TypeA" NTV {
                    "common_attribute" StrArr [ "id" ],
                },
                "TypeB" NTV {
                    "common_attribute" StrArr [ "id",
"id2" ],
                },
            },
        },
    },
}
```

A reference-based relationship using reference-by-handle may be shown in the following example pseudo-code:

```
"data_objects" NTV {
    "Foo" NTV {
        "attributes" NTV {
            "barHandle" NTV {
                ...
            },
        },
    },
},
"relationships" NTV {
    "FooBar" NTV {
        "source" NTV {
            "data_object" Str "Foo",
            "access_name" Str "bar",
            "cardinality" Str "0..1",
            "rel_obj_handle_attr" Str "barHandle",
        },
        "target" NTV {
            "access_name" Str "foo",
            "cardinality" Str "0..1",
            "data_objects" NTV {
                "TypeA" NTV {
                },
```

-continued

```
            "TypeB" NTV {
            },
        },
    },
    },
}
```

An association-based relationship may be a relationship wherein a POF object exists that serves as an intermediary between the related objects. The intermediary object may be known as an association object. As association-based relationships are established and de-established between objects, POF 120 automatically creates and removes the association objects as necessary. The association objects automatically are stored and removed from the data source when the store method is invoked on either of the objects in the relationship and/or when the relationship is severed. Thus, the developer may not need to be aware of the existence of the association objects.

Relationships that have a many-to-many cardinality, and relationships wherein none of the related objects is fixed should always be association-based relationships because they desire the intermediary object. Association-based relationships also may be used for other types of relationships, however, it may not be required or recommended that they do so.

Every association-based relationship may be defined in terms of two reference-based relationships. One of the reference-based relationships may be defined as being between one of the related object types and the association object type, while the other reference-based relationship may be defined between the other related object type and the association object type. The association-based relationship also contains information that indicates how to automatically bridge the two reference-based relationships. Association-based relationships may be specified in data model 210 by the examples disclosed below.

An association-based relationship using reference-by-handle and reference-by-foreign-key may be shown in the following example pseudo-code:

```
"data_objects" NTV {
    "FooBarAssoc" NTV {
        "attributes" NTV {
            "fooHandle" NTV {
                ...
            },
            "barID" NTV {
                ...
            },
        },
    },
},
"relationships" NTV {
    "Foo-FooBarAssoc" NTV {
        "source" NTV {
            "data_objects" NTV {
                "Foo" NTV {},
                "Foo2" NTV {},
            },
            "access_name" Str "fooBarAssocs",
            "cardinality" Str "0..n",
        },
        "target" NTV {
            "data_object" Str "FooBarAssoc",
            "access_name" Str "foo",
            "cardinality" Str "1..1",
            "rel_obj_handle_attr" Str "fooHandle",
        },
    },
    "Bar-FooBarAssoc" NTV {
        "source" NTV {
            "data_object" Str "Bar",
            "access_name" Str "fooBarAssocs",
            "cardinality" Str "0..n",
            "common_attributes" StrArr [ "id" ],
        },
        "target" NTV {
            "data_object" Str "FooBarAssoc",
            "access_name" Str "bar",
            "cardinality" Str "1..1",
            "common_attributes" StrArr [ "barID" ],
        },
    },
    // Association-based relationships (e.g. "Foo-Bar")
    // must be specified in the configuration after
    // the specifications for the reference-based
    // relationships to which it refers
    // (i.e. "Foo-FooBarAssoc" and "Bar-FooBarAssoc").
    "Foo-Bar" NTV {
        "source" NTV {
            "access_name" Str "bars",
            "cardinality" Str "0..n",
            "assoc_rel" Str "Foo-FooBarAssoc",
            "assoc_role" Str "source",
        },
        "target" NTV {
            "access_name" Str "foos",
            "cardinality" Str "0..n",
            "assoc_rel" Str "Bar-FooBarAssoc",
            "assoc_role" Str "source",
        },
    },
}
```

Properties may be named values that are specific to a persistent object type, attribute or relationship. These values may be specified in data model 210 and apply to all instances of the persistent object type. Two types of properties may exist: pre-defined and custom. POF 120 may include the following set of pre-defined properties:

| | Pre-Defined Object Properties | | |
|---|---|---|---|
| Symbolic Name | String Name | Value Type | Description |
| CXPObject.OBJ_PROP_TYPE_NAME | "type_name" | String | The object type name. |

| Pre-Defined Attribute Properties | | | |
|---|---|---|---|
| Symbolic Name | String Name | Value Type | Description |
| CXPObject.ATTR_PROP_DATA_TYPE | "data_type" | Class | The Java Class representing the data type of the attribute. One of: String.class, Interger.class, Long.class, Boolean.class, java.math.BigDecimal.class, or java.util.Date.class. |
| CXPObject.ATTR_PROP_REQUIRED | "required" | Boolean | "true" if the attribute must have a value before the transaction is committed, "false" if the value is not required. |
| CXPObject.ATTR_PROP_PRIMARY_KEY | "primary_key" | Boolean | "true" if the attribute is part of the primary key of the object, "false" if the attribute is not part of the primary key. |
| CXPObject.ATTR_PROP_TRANSIENT | "transient" | Boolean | "true" if the attribute is transient (i.e. it's value is not saved), "false" if the attribute is persistent. |
| CXPObject.ATTR_PROP_INITIAL_VALUE | "initial_value" | | The initial value to assign to this attribute when first created. The value type should match the attribute's data type. |

| Pre-Defined Relationship Properties | | | |
|---|---|---|---|
| Symbolic Name | String Name | Value Type | Description |
| CXPObject.REL_PROP_CARDINALITY_MULTIPLE | "cardinality_multiple" | Boolean | true if relationship allows multiple values, false otherwise. |
| CXPObject.REL_PROP_REL_OBJECT_TYPES | "rel_object_types" | Array of String | Names of object types that are valid for related object. |

Properties may be defined by the business objects that extends the POF base object. The properties may be specified as custom properties in data model 210. An example of specifying custom properties may be shown by the following pseudo-code:

```
"data_objects" NTV {
    "SXOrder" NTV {
        "attributes" NTV {
            "xyz" NTV {
                "attr_name" Str "xyz",
                "custom_props" NTV {
                    // Specify a custom property for attr
"xyz" of object type "SXOrder"
                    // with the String value "bar".
                    "foo" Str "bar",
                    // Specify a custom property for attr
"abc" of object type "SXOrder"
                    // with the Integer value of "100".
                    "abc" Int "100",
                }
            }
        }
    }
}
```

POF 120 also includes cache 214 that stores persistent objects for managing the persistent objects without accessing a data source. POF 120 may perform operations on persistent objects in cache 214. Persistent objects may be cached in cache 214 for the duration of the user session. When a user logs in the cached objects may be accessed until the session ends, usually the time when the user logs out. Cache 214 may be private to the session. Requests received during the session may be processed. When the session is complete, the existence of an exception, if it occurred, during the session is noted. By noting any exceptions, the proper resources may be freed from cache 214.

Figure 3:
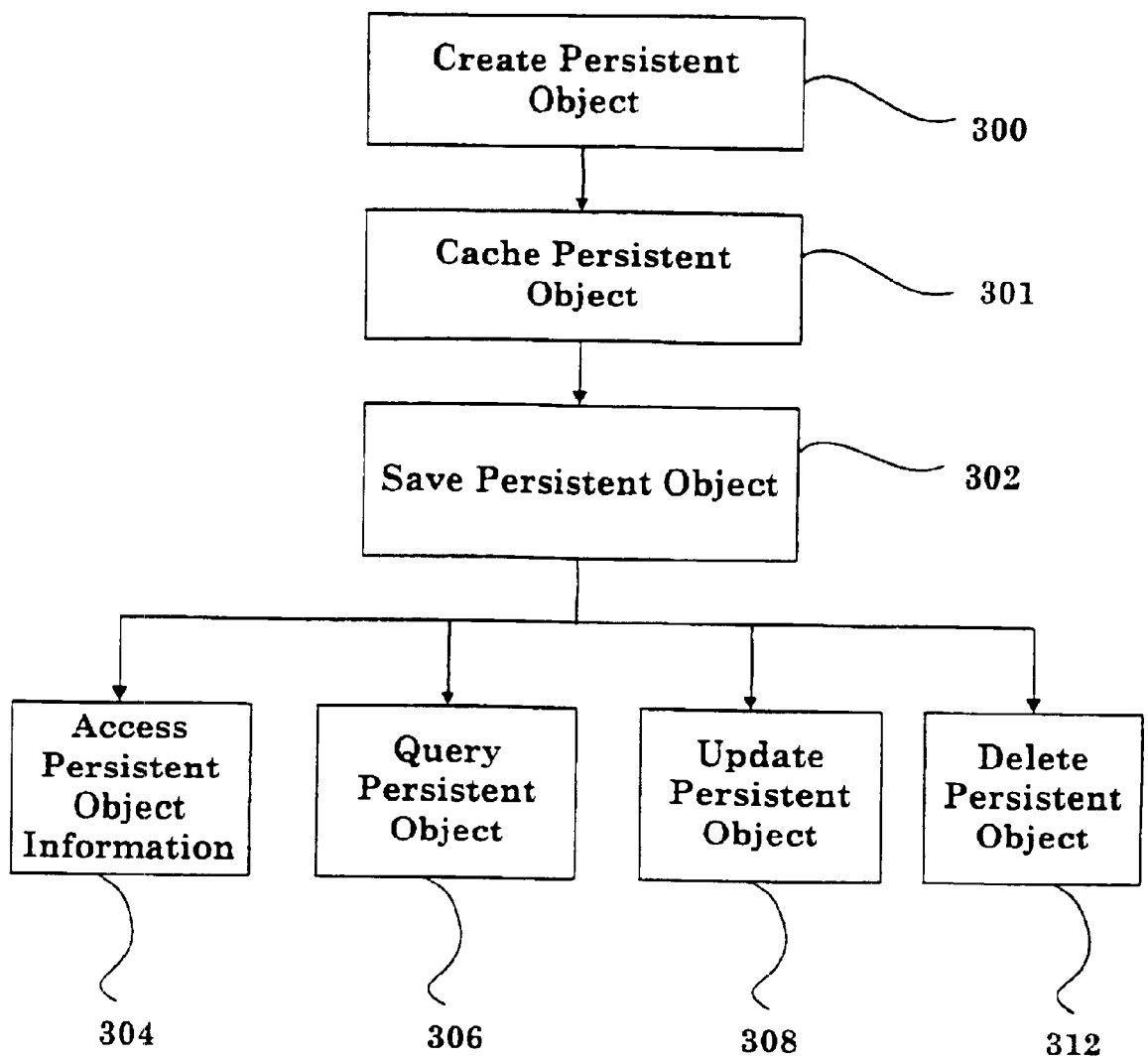
FIG. 3 illustrates a flowchart for managing persistent objects within a persistent object framework in accordance with an embodiment of the present invention.

FIG. 3 depicts a flowchart for managing persistent objects within a persistent object framework in accordance with an embodiment of the present invention. Step 300 executes by creating a new persistent object. To create a new persistent object, initial values for the attributes are propogated. FIG. 4 refers to creating a new persistent object in greater detail below.

Step 301 executes by caching the persistent object within POF 120. The persistent object is stored within cache 214 of POF 120. Cached persistent objects may be limited to those persistent objects likely to be accessed during the user session.

Step 302 executes by saving the persistent object. Newly-created persistent objects may not be saved immediately. The object may be inserted into the data source when a save transaction has been committed, or a flush method has been invoked. The following example pseudo-code discloses how to save a new orders object. The pseudo-code indicates that the primary key for the "Order" object type is generated automatically by either sequence-generation or GUID-generation, and, that no initial values may be needed.

```
void
sampleMethod(CXPContext context)
    throws CXException
{
    CXPObject order1, order2, order3;
    Object initVals[] = {
        "code", "Ord-ABC",
        "totalPrice", new BigDecimal(500.25)
    };
    // Create a new order with
    // attribute "foo" set to "foo value".
    order1 = context.createObj("Order");
    order1.setStr("foo", "foo value");
    // Persistently save the new order.
    context.makePersistent(order1);
    // Create a new order, with the initial value of
    // the "code" attribute set to "Ord-ABC",
    // and the "totalPrice" attribute set to 500.25.
    order2 = context.createObj("Order", initVals);
    // Persistently save the new order.
    context.makePersistent(order2);
```

```
            // Create a new order, with initial values copied
            // from order1, overriding the initial value of
            // the "code" attribute to "Ord-ABC",
            // and the "totalPrice" attribute to 500.25.
            order3 = context.createObj(order1, initVals);
            context.makePersistent(order3);
        }
```

Step 304 executes by accessing persistent object information. This step also may be known as "introspection." POF 120 may access the persistent object for information on its type, attributes, relationships, and properties. The following example pseudo-code discloses how to access a persistent object:

```
void
    sampleMethod(CXPObject obj)
        throws CXException
    {
        // Get the names of all attributes for this object.
        Collection anames = obj.getAttrNames( );
        System.out.println("Number of Attrs = " + anames.size( ));
        // Check for the existence of an attribute named "xyz".
        if (anames.contains("xyz"))
            System.out.println("Attribute xyz exists.");
        else System.out.println("Attribute xyz does not exist.");
        // Print the attribute name and value and the name and value of
all of the
        // properties for all persistent (i.e. non-transient) attributes of
the object.
            Iterator aiter = anames.iterator( );
            while (aiter.hasNext( )) {
                String aname = (String) aiter.next( );
                if (!((Boolean)obj.getAttrProp(aname,
    CXPObject.ATTR_PROP_TRANSIENT)).booleanValue( )) {
                    Object val = obj.getValue(aname);
                    System.out.println("Attr Name = " + aname);
                    System.out.println("Attr Value = " + val);
                    Iterator piter =
obj.getAttrPropNames(aname).iterator( );
                    while (piter.hasNext( )) {
                        String pname = (String) piter.next( );
                        Object pval = obj.getAttrProp(aname,
pname);
                        System.out.println("Prop Name = " +
pname);
                        System.out.println("Prop Value = " + pval);
                    }
                }
            }
            // Get the names of all relationships of this object.
            Collection rnames = obj.getRelNames( );
            System.out.println("Number of Rels = " + rnames.size( ));
            // Print the name of all relationships of the object.
            Iterator riter = rnames.iterator( );
            while (riter.hasNext( )) {
                String rname = (String) riter.next( );
                System.out.println("Rel Name = " + rname);
            }
    }
    POF 120 also may access properties according to the following
pseudo-code example:
    void
        sampleMethod(CXPObject obj)
            throws CXException
        {
            // Print the object type name and description.
            System.out.println("Type = " +
        (String)obj.getObjProp(CXPObject.OBJ_PROP_TYPE_NAME));
            // Print the data type and "foo" custom property value for "xyz"
attribute.
            System.out.println("Attr 'xyz' Data Type = "
                + ((Class)obj.getAttrProp("xyz",
    CXPObject.ATTR_PROP_DATA_TYPE)).getName( ));
            System.out.println("Attr 'xyz' 'foo' Property = "
                + (String)obj.getAttrProp("xyz", "foo"));
            // Print the description for the "pdq" relationship.
            System.out.println("Rel 'pdq' Allows multiple values = "
                + (Boolean)obj.getRelProp("pdq",
        CXPObject.REL_CARDINALITY_MULTIPLE));
        }
```

Step 306 executes by querying the persistent object. The querying step is disclosed in greater detail with reference to FIG. 5.

Step 308 executes by updating the persistent object. Persistent objects may be updated, or modified, by invoking the persistent object set methods. The changes may be marked automatically to be stored persistently. The changes may not be saved in the data source, such as database 104, until the transaction is committed, or when a flush method is invoked.

Step 312 executes by deleting the persistent object. POF 120 may delete objects persistently in a straight-forward manner. Different methods may exist to delete persistent objects. First, persistent objects may be deleted by primary key, or by object type name and the primary key. Second, persistent objects may be deleted by handle. Third, persistent objects may be deleted by referencing the persistent object. When a persistent object is deleted, all relationships to the object may be automatically removed. The deletion of the object and removal of the relationships may not be changed in the data source until the transaction has been committed, or when a flush method is invoked. The following example pseudo-code discloses how to delete a persistent object according to each of the methods:

```
void
    sampleMethod(CXPContext context,
            String orderPKey,
            String orderHdl,
            CXPObject order)
        throws CXException
    {
        CXPObject order2;
        // Delete the order with a given primary key.
        // context.removeObj("Order", orderPKey);
        order2 = context.findByPrimaryKey("Order", orderPKey);
        if (order2 != null)
            System.out.println("You will never see this.");
        // Delete the order with a given handle.
        context.removeObj(orderHdl);
        order2 = context.findByHandle(orderHdl);
        if (order2 != null)
            System.out.println("You will never see this.");
        // Persistently delete an order.
        context.removeObj(order);
    }
```

Figure 4A:
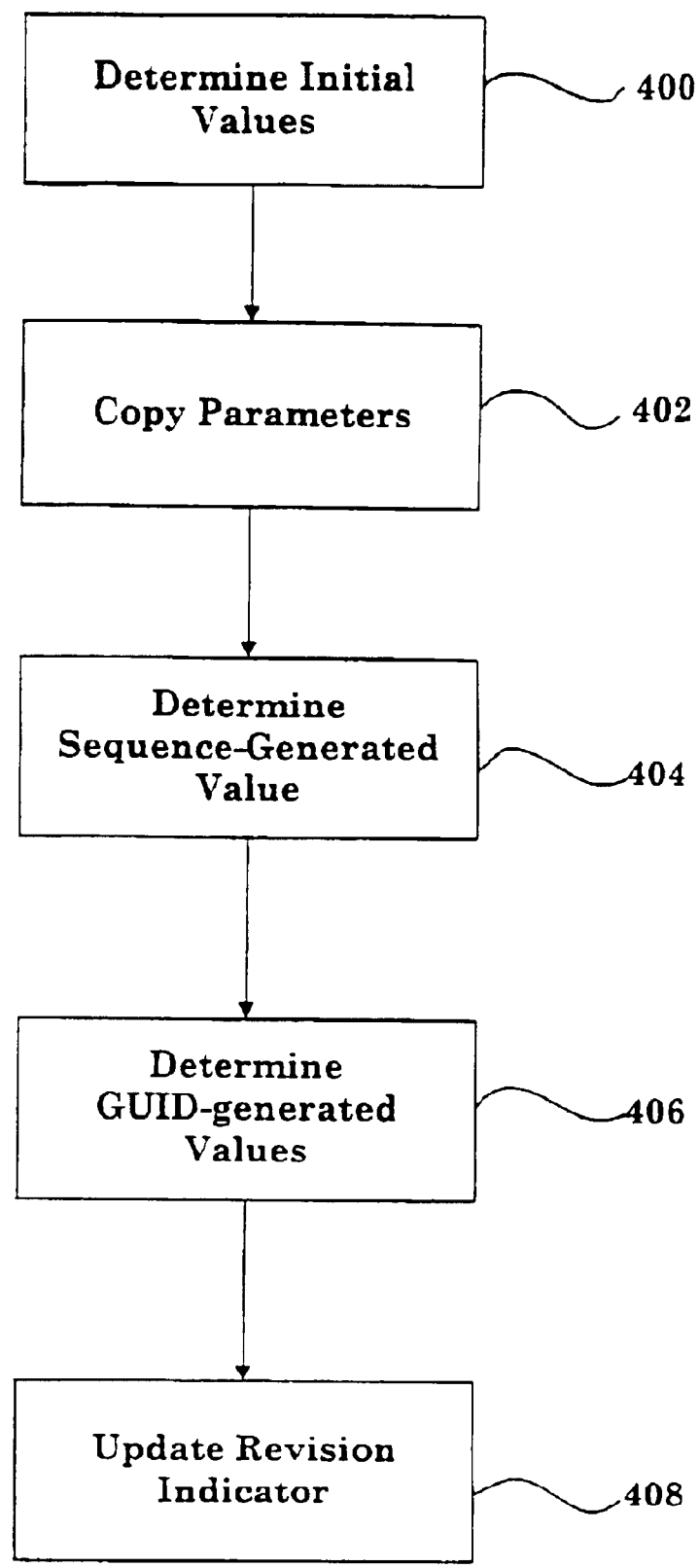
FIG. 4A illustrates a flowchart for determining initial values for attributes when creating a persistent object in accordance with an embodiment of the present invention.

FIG. 4A depicts a flowchart for determining initial values for attributes when creating a persistent object in accordance with an embodiment of the present invention. The initial values for attributes within data model 210 may be propagated to facilitate creating a new persistent object. The flowchart correlates with step 300 of FIG. 3. Step 300, however, is not limited to the steps disclosed by FIG. 4A.

Step 400 executes by determining the initial values for attributes that are specified in data model 210. The initial values are filled. Step 402 executes by copying the attributes of object parameters. Attributes that are part of a foreign key reference may be exempt from this step. Step 404 executes by determining the attributes defined as having sequence-generated values in data model 210. The initial values are filled with the newly generated sequence value. Step 406 executes by determining the attributes defined as having GUID-generated values in data model 210. The initial values are filled with the newly generated GUID value. Step 408 executes by updating those attributes having a revision indicator in data model 210. The revision indicator may be updated with a value of 1. Revision indicators are disclosed in greater detail below.

Figure 4B:
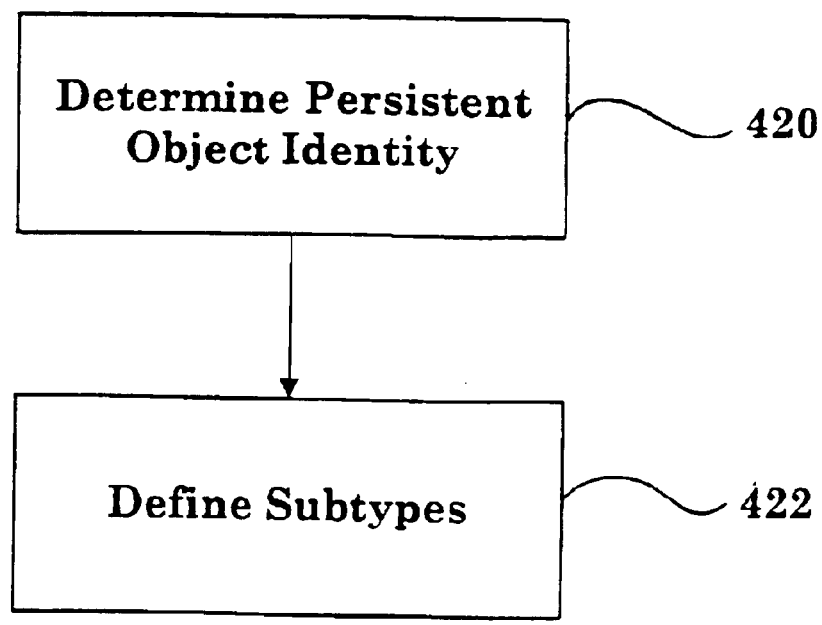
FIG. 4B illustrates a flowchart for configuring a persistent object in accordance with an embodiment of the present invention.

FIG. 4B depicts a flowchart for configuring a persistent object in accordance with an embodiment of the present invention. Certain values and configuration issues should be resolved when creating a persistent object. Again, the flowchart correlates with step 300 of FIG. 3. Step 300, however, is not limited to the steps disclosed in FIG. 4B.

Step 420 executes by determining a persistent object identity for the persistent object. Each type of persistent object may specify a set of attributes that correspond to a primary key for that object type so that each persistent object instance may be uniquely identified. POF 120 may guarantee that for each unique persistent object, there exists, at most, one instance of the persistent object in memory for a given context. Certain implications may arise. First, changes to every persistent object may be "seen" by every reference to the same persistent object. This implication may guarantee view consistency. Second, persistent object references may be compared to determine if the references are referring to the same object by using an "==" operator.

Copies of persistent objects may be made, however, the copies should have a primary key that differs from the copied object. The copies may be identified as separate objects, independent of the persistent objects from which they were copied.

Step 422 executes by defining subtypes and supertypes of a persistent object. POF 120 supports specifying object types that are subtypes of other object types. Subtypes of a given supertype may have certain commonalities. With regard to interfacing with POF 120, all attributes defined in the supertype may apply to all of the subtypes. For example, a type named "Order" may have subtypes named "SalesOrder" and "PurchaseOrder," where the "Order" type defines attributes common to all types of Orders. Further, all relationships defined for the supertype may apply to all of the subtypes. Moreover, if a different Java class is defined for each subtype, methods may be defined in the superclass that are either abstract or are implemented solely in terms of the common attributes. Subclasses may override these methods by using knowledge of the specific subtype, such as additional type-specific attributes in their implementation. For example, the type named "Order" may have a method named "cancel" that have a different implementation for objects of type "SalesOrder" than for objects of type "PurchaseOrder."

With regard to persistent storage, all attributes defined in the supertype may be stored persistently using the same schemas for the supertype and all of the subtypes. For example, all objects of type "Order" may have the attribute values stored in the "Order" table. Subtype-specific attributes may be defined as being stored either in the same table or in subtype-specific tables. With regard to properties, property values that may not have values specified in subtypes have their values inherited from the supertypes.

The attributes that compose the primary key may be the same for the base type and all of its subtypes. If a subtype specifies multiple inheritance, all inherited types may share a common base type. Attributes with the same name may have to be merged into one attribute in the subtypes. It may be an error if the attributes with the same name are not rooted in the same supertype. Further, properties may be merged. If a subtype inherits different values for a given property, it is an error if the subtype does not define a value for that property.

When objects are created, a type tag attribute value may fill automatically with the value of a type tag value for the type of object being created. If a type defines a value for type tag attribute or a subtype, and does not specify a value for type tag value, then the type is an abstract type. An abstract type indicates that concrete instances of this type may not be created. Instances of subtypes of the abstract type that are not themselves abstract may have instances of their subtype created. It may be an error for more than one subtype of a given type to have the same value for type tag value. Subtypes also may have subtypes.

If subtypes specify attributes with the same name as those defined in the supertype, the declarations augment the existing attribute rather than override the attribute as a new attribute. The augmentation may be performed for specifying the mapping of primary key attributes to subtype-specific schemas, overriding property values, and specifying a different default value for an attribute of the subtype.

Every object has its type defined at the time it is first created, and it may not change. Any attempt at changing the type tag attribute may result in an exception being thrown. Queries of the base type may produce all objects that match the query filter and that are of the base type or any of its subtypes. No objects may exist as instances of abstract types. Each object may be seen as an instance of the type denoted by the value of the type tag attribute.

When every object is first created, it may be known as its final type. The final type may not be changed for the lifetime of the object. There may be an attribute for every type that has subtypes or is a subtype itself, known as the type tag attribute whose value indicates the final type of the object. The attribute is set automatically, and any attempt to change its value may result in an exception being thrown.

An object of type query may return true if an object is of a specified type or any of its subtypes. Queries of a given type produce all objects that match the query filter that are of the queried type or any of its subtypes. Objects always appear as instances of their final type. Even if an object is found by way of a query of a supertype, the objects that match the query, but are of subtypes of the queried type, may appear as instances of their final type, and not the queried supertype. Any type that has subtypes or is a subtype itself and does not have a value for the type tag attribute specified may be abstract and may not have instances created of its type. Any attempt to do so may result in an exception being thrown.

The following pseudo-code example is a sample data model definition for a Transaction type with subtypes CreditCardTransaction and AccountTransaction:

```
"data_objects" NTV {
    "Transaction" NTV {
        "class_name" Str "Transaction",
        "type_tag_attr" Str "txType",
        "attributes" NTV {
            "txType" NTV {
                "attr_name" Str "txType",
                ...
            },
            ...// Specify attrs that all Transactions have here.
        },
    },
```

-continued

```
"CreditCardTransaction" NTV {
    "class_name" Str "CreditCardTransaction",
    "inherits" StrArr [ "Transaction" ],
    "type_tag_value" Str "CC",
    "attributes" NTV {
        ...// Specify CreditCardTransaction specific attrs
        here.
    },
},
"AccountTransaction" NTV {
    "class_name" Str "AccountTransaction",
    "inherits" StrArr [ "Transaction" ],
    "type_tag_value" Str "ACCT",
    "attributes" NTV {
        ...// Specify AccountTransaction specific attrs here.
    },
},
}
```

The rules and restrictions described above may apply to the Transaction type defined above. For example, when using createObj( ), if the type name is specified as "CreditCardTransaction," the "txType" attribute automatically is assigned the value of "CC." When using createObj( ), if the type name is specified as "AccountTransaction," the "txType" attribute automatically is assigned the value of "ACCT." When using createObj( ), if the type name is specified as "Transaction," an exception may be thrown. The exception is because the Transaction type does not specify a value for type tag value, so that it is an abstract type.

Instances of Transaction where the "txType" attribute value is "CC" always may be instances of CreditCardTransaction. Instances of Transaction where the "txType" attribute value is "ACCT" always may be instances of AccountTransaction. Any value for "txType" other than "CC" or "ACCT" may be invalid and no object may contain another value. Queries of the Transaction type may produce objects of type CreditCardTransaction and AccountTransaction. No instances of type Transaction may be produced because it is an abstract type. Queries of the CreditCardTransaction type may produce only instances of CreditCardTransaction. Queries of the AccountTransaction type may produce only instances of AccountTransaction.

Figure 5:
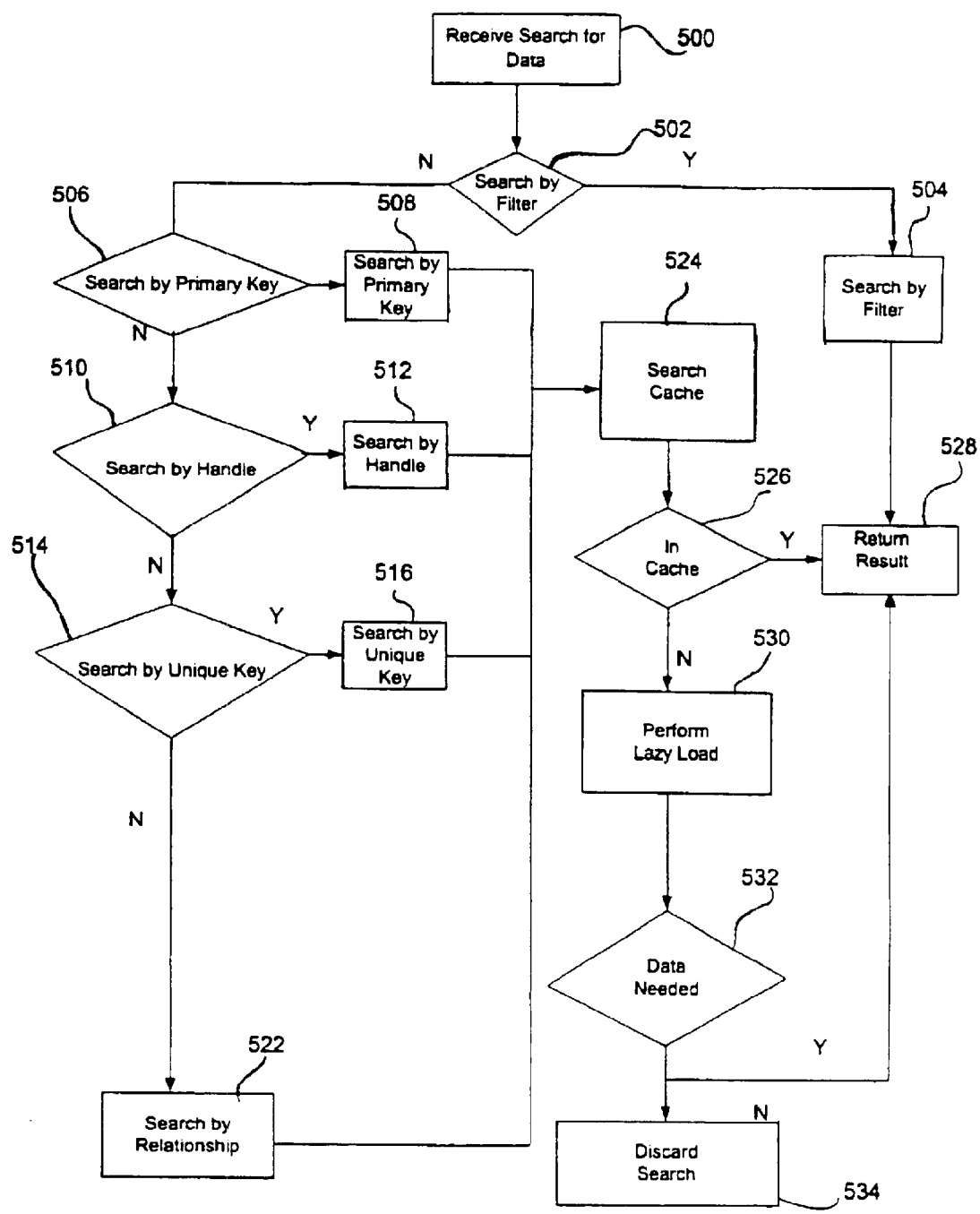
FIG. 5 illustrates a flowchart for searching for objects within a persistent object framework in accordance with an embodiment of the present invention.

FIG. 5 depicts a flowchart for searching for objects within a persistent object framework in accordance with an embodiment of the present invention. "Searching for objects" also may be known as querying for objects. Step 500 executes by receiving a search for data. Preferably, Java application 102 requests data for an operation or transaction. Base architecture 110 acknowledges that the search request has been received and attempts to return a result. Step 502 executes by determining whether the search is by filter, or by primary key, handle, unique key or relationship to another object. If step 502 is yes, then step 504 executes by searching by filter. Preferably, a filter search is performed using a query class. Further, when a filter search is performed, a data source connection may be acquired and held until the query has been terminated. The filter search may terminate automatically when it is determined that there are no more matches, returns false, or throws an exception. If it is determined that a filter search is no longer desired but has not terminated, then termination may be invoked explicitly. Otherwise, the data connections may not be released.

If step 502 is no, then the object search is performed by primary key, handle, unique key or relationship, as depicted by steps 506–530. Step 506 executes by determining whether the search is by primary key. If yes, then step 508 executes by setting up a search by primary key. The following example is pseudo-code discloses searching by primary key:

```
void
sampleMethod(CXPContext context,
        String orderPKey)
    throws CXException
{
    // Query for an order, given its primary key.
    CXPObject order
        = context.findByPrimaryKey("Order",
                    orderPKey);
    if(order != null)
        System.out println("Order:"
                + order.getStr("coe"));
        else System.out.println("Order not found.");
}
```

If step 506 is no, then step 510 executes by determining whether the search is by handle. If yes, then step 512 executes by setting up a search by handle. The following example pseudo-code discloses searching by handle:

```
void
sampleMethod(CXPContext context,
        String orderHd1)
    throws CXException
{
    // Query for an order, given its handle.
    CXPObject order
        = context.findByHandle("Order",
                    orderHd1);
    if(order != null)
        System.out println("Order:"
                + order.getStr("coe"));
        else System.out.println("Order not found.");
}
```

If step 510 is no, then step 514 executes by determining whether the search is by unique key. If yes, then step 516 executes by setting up a search by unique key. The following example pseudo-code discloses searching by unique key:

```
void
sampleMethod(CXPContext context)
    throws CXException
{
    // Query for the order with 'code' == 'Order-XYZ'.
    Object[] key = {"code", "Order-XYZ"};
    CXPObject order
        = context.findByUniqueKey("Order", key);
    if(order != null)
        System.out.println("Order found.");
        else System.out.println("Order not found.");
}
```

If step 514 is no, then step 522 executes setting up a search by relationship. Preferably, the relationship search is for relationships to another object. Searches and queries by relationships are disclosed in greater detail with regard to FIG. 6.

All searches by primary key, handle, unique key, criteria and relationship proceed to step 524 that executes by searching the cache of POF 120. Searching the cache initially allows POF 120 to bypass expensive and time-consuming data source queries whenever possible. All data source queries having matching objects returned from the cache may be found there. Matching objects from the cache may trump the data in the data source result set, if applicable.

Step 526 executes by determining whether the data is in the cache, and found by the search. If yes, then step 528 executes by returning the search result. If no, then step 530 executes by perform a lazy load procedure. "Lazy load" improves performance by limiting the queries to data sources. The premise of lazy load is that queries for data from data sources may be deferred until it is determined that the data is needed. Thus, if some data is not needed, performance gains may result from eliminating unnecessary data source queries. Deferred data queries, which may result in future lazy loads, may occur in two situations. First, when a search for a related object occurs where the source object contains attribute values that reference the target related object and the target related object is not already in the cache, the query for the object is deferred. Second, when a search turns up an object that is a subtype of the queried object type that contains part of its data in a schema that applies to the subtype, the query for the part of the object that is in the schema that is subtype-specific is deferred.

During lazy load, if any part of the object is not found, an exception may be thrown. Exceptions thrown from a lazy load may be caused by one of two situations. First, the data in question has been removed from persistent storage since the referring object was loaded. In this case, a retry should succeed and a repeat of the exception should be avoided. Second, there is bad data in persistent storage. In this case, any number of retries still may result in the same exception being thrown. After the application's maximum retry count, the exception may be logged as an error. These exceptions may contain a parameter indicating that the object has a problem that can be identified by a database administrator to fix the problem.

Exceptions that occur as the result of an object being stored or removed where one or more of the changed or removed schema records does not exist persistently also may exhibit this problem when the object was activated originally by way of a relationship. In this case, and in the case where the first attempted loading of an object gotten by way of a get-relative object method, the parameters to the exceptions may not be sufficient in and of themselves to determine where the data problem exists. A tool may be provided to database administrators that finds objects in the database with references to the non-existent object so that they may be freed.

Step 532 determines, as noted above, whether the data from the data source is needed by the application. If yes, then step 528 executes by returning the result. If no, such that the application executes by not needing the data, then step 534 executes by discarding the search.

In order to improve performance, usage filtered queries should be minimized, and queries by primary key, handle, unique key, criteria or relationships should be maximized. The performance of these query processes is better than using filter queries because when the objects are already cached in POF 120, then these processes may retrieve the objects without doing a database query. Further, database updates may be delayed until the end of the transaction, which results in less contention and potentially improved performance due to buffering changes. This advantage is due to an implicit invocation of a flush method and should be done in order to guarantee that results are consistent with in-memory changes.

Thus, the steps that access the database are limited to performing the lazy load and searching by filter. These steps are executed after the cache is searched, which reduces the number of database accesses. Further, once an object is fetched from the database, POF 120 caches the object so that the following query may retrieve the object from the cache directly without going back to the database.

Figure 6:
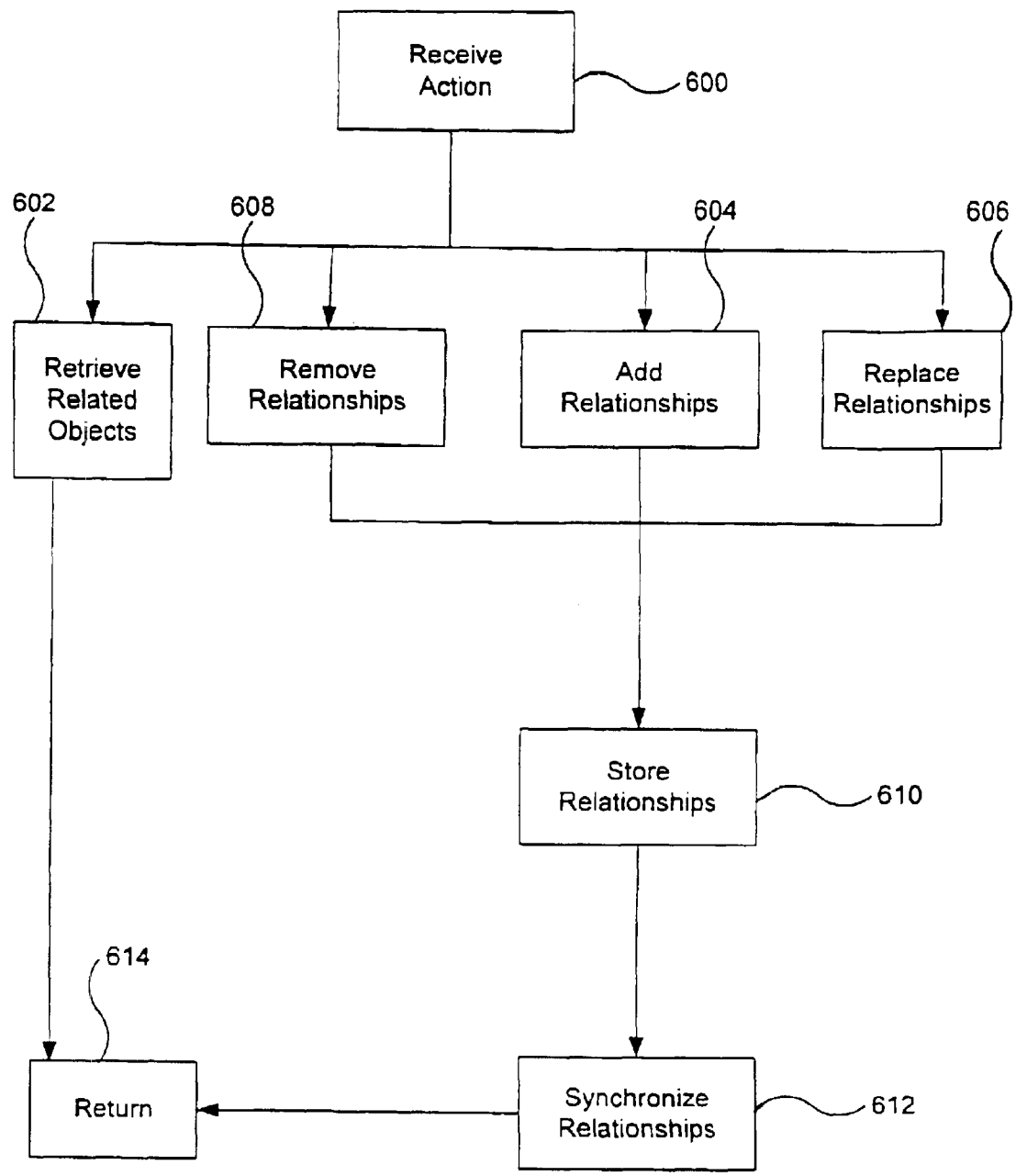
FIG. 6 illustrates a flowchart for managing objects through relationships in accordance with an embodiment of the present invention.

FIG. 6 depicts a flowchart for managing objects through relationships in accordance with an embodiment of the present invention. FIG. 6 includes searching, or retrieving, objects according to their relationships, as disclosed in step 522 of FIG. 5. Step 522, however, is not limited to the steps disclosed by FIG. 6. As noted above, a relationship expresses a link between two persistent objects. Step 600 executes by receiving an action to be performed via an object's relationship. Step 602 executes by retrieving related objects. Preferably, POF 120 retrieves objects in response to a search request from an application. POF 120 may retrieve objects according to multiple or singular cardinality relationship roles. The different methods of retrieving objects according to relationships may be disclosed according to the following examples. For multiple card inality relationship roles, a variable named "buyer" that references an object of type "Company" or "Person" and a variable named "Order" that references an object of type "Order" may be given. The orders may be retrieved according the following example pseudo-code:

Collection orders=buyer.getRelObjs ("orders");

An empty Collection is returned if there are no related objects. In this manner, a Collection may be returned and no check for null return value needs to be done. If a get-relative-object method is invoked on this relationship role, an exception may be thrown.

For singular cardinality relationship roles, with a variable named "order" that references an object of type "Order," the buyer may be retrieved in any of the following pseudo-code examples:

Collection buyers=order.getRelObjs ("buyers");

CXPObject buyer=order.getRelObj ("buyer");

Object buyer=order.getValue ("buyer");

The Collection returned from get-relative-objects method may have no more than one element. An empty Collection may be returned if there are no related objects. In this manner, a Collection always may be returned and no check for null return value needs to be done.

Step 604 executes by adding relationships to an object. The different methods of adding relationships may be disclosed according to the following examples. For multiple cardinality relationship roles, a variable named "buyer" that references an object of type "Company" or "Person" and a variable named "order" that references an object of type "order" may be given. The "order" may be related to the buyer, retaining pre-existing "orders" relationships to the buyer, according to the following pseudo-code:

buyer.addRel ("orders", order);

For singular cardinality relationship roles, a variable named "order" that references an object of type "Order" and a variable named "buyer" that references an object of type "Company" or "Person" may be given. The "buyer" may be related to the order according to the following pseudo-code:

order.addRel ("buyer", buyer);

If there is already a pre-existing "buyer" related to the "order," an add-related-object method may result in an exception being thrown.

Step 606 executes by replacing relationships of an object. The different methods for replacing relationships may be disclosed according to the following examples. For multiple cardinality relationship roles, a variable named "buyer" that references an object of type "Company" or "Person" and a variable named "order" that references an object of type "Order" may be given. The "order" may be related to the buyer and replaces pre-existing "orders" relationships to the buyer according to the following pseudo-code example:

buyer.setRel ("orders", order);

For singular cardinality relationship roles, a variable named "order" that references an object of type "Order" and a variable named "buyer" that references an object of type "Company" or "Person" may be given. The "buyer" may be related to the order and replaces any pre-existing "buyer" relationship to the order according to the following pseudo-code examples:

order.setrel ("buyer", buyer);

order.setvalue ("buyer", buyer);

Step 608 executes by removing relationships of an object. The different methods for removing relationships may be disclosed according to the following examples. For multiple cardinality relationship roles, a variable named "buyer" that references an object of type "Company" or "Person" and a variable named "order" that references an object of type "Order" may be given. The relationship between the "buyer" and the "order" may be removed according to the following pseudo-code:

buyer.removeRel ("orders", order);

For singular cardinality relationship roles, a variable name "order" that references an object of type "Order" and a variable named "buyer" that references an object of type "Company" or "Person" may be given. The relationship between the "order" and the "buyer" may be removed according to any of the following pseudo-code examples:

order.removeRel ("buyer", buyer);

order.setRel ("buyer", null);

order.setValue ("buyer", null);

Step 610 executes by storing the relationships persistently. In order for relationships to be stored persistently, persistent "referencing attributes" should be defined that store information that may be used to reconstruct automatically the relationship when the objects are loaded into memory. Different forms of specifying "referencing attributes" may exist, and how they are used to reconstruct the relationship. According to the following example, the "Purchase" relationship may be assumed to be between an "Order" and a "Person," thereby leaving out the possibility of a "Company" in the relationship. The definition of the "referencing attributes" for the "Purchase" relationship may given as:

| 'order' Role Object Attributes | 'buyer' Role Object Attributes |
| --- | --- |
| buyer_id | id |

In this example, the "buyer_id" attribute defined in the "Order" object type is the sole "referencing attribute" and the "id" attribute defined in the "Person" object type is the sole "referenced attribute." This relationship may be known as a "foreign key" relationship. Relationships that are added, removed or changed may be made persistent when the transaction is committed or when the flush method is invoked.

Step 612 executes by synchronizing the relationships between the modified object and other objects. Relationships automatically may be kept in sync whenever a relationship is added, removed or changed, or if the value of any of the "referencing attributes" is changed. The following example pseudo-code discloses the synchronization:

```
void
sampleMethod(CXPContext context, CXPObject order)
    throws CXException
{
    CXPObject buyer = order.getRelObj("buyer");
    Object buyer_id = buyer.getValue("id");
    Collection orders;
    orders = buyer.getRelObjs("orders");
    int origCnt = orders.size( );
    // Verify that the relationship is set up correctly.
    if(!orders.contains(order))
        System.out.println("You will never see this.");
    if(!buyer_id.equals(order.getValue("buyer_id")))
        System.out.println("You will never see this.");
    // Remove the relationship between the order and the buyer.
    // The values of the attributes of the order that are foreign
    // keys to the buyer are automatically set to null.
    // The order and buyer will both still exist, however they
    // will no longer be related.
    buyer.removeRel("orders", order);
    // Need to get the related objects again to verify
    // that the relationship was removed.
    orders = buyer.getRelObjs("orders");
    // Verify that the number of orders for the buyer
    // is one less than before.
    if(orders.size( ) != origCnt —1)
        System.out.println("You will never see this.");
    // Verify that the relationship has been severed
    // from the buyer's perspective.
    if(orders.contains(order))
        System.out.println("You will never see this.");
    // Verify that the relationship has been severed
    // from the order's perspective.
    if(order.getRelObj("buyer") != null)
        System.out.println("You will never see this.");
    if(order.getValue("buyer_id") != null)
        System.out.println("You will never see this.");
    // Restore the relationship, from the
    // order's side of the relationship.
    // The attributes of the order that are foreign
    // keys to the buyer are automatically filled in.
    order.setRel("buyer", buyer);
    // NOTE: The following line of code is equivalent
    // to the one above and can also be used to
    // restore the relationship:
    // buyer.addRel("orders", order);
    // NOTE: The following line of code is yet another
    // (although not recommended) way to restore the
    // relationship:
    // order.setValue("buyer_id", buyer_id);
    orders = buyer.getRelObjs("orders");
    // Verify that the number of orders for the buyer
    // has been restored.
    if(orders.size( ) != origCnt)
        System.out.println("You will never see this.");
    // Verify that the relationship has been restored
    // from the buyer's perspective.
    if(!orders.contains(order))
        System.out.println("You will never see this.");
    // Verify that the relationship has been restored
    // from the order's perspective.
    if(order.getRelObj("buyer") != buyer)
        System.out.println("You will never see this.");
    if(!buyer_id.equals(order.getValue("buyer_id")))
        System.out.println("You will never see this.");
}
```

Removing an object persistently using a remove method automatically causes the removal of all relationships to the object. The "referencing attributes" affected by these removals automatically are stored persistently when the transaction has been committed, or then a flush method is invoked. The following example pseudo-code discloses the effect of an object removal on relationships:

```
void
sampleMethod(CXPContext context, CXPObject order)
        throws CXException
{
    CXPObject buyer = order.getRelObj("buyer");
    Collection orders;
    orders = buyer.getRelObjs("orders");
    int origCnt = orders.size( );
    // Remove the order persistently.
    context.removeObj(order);
    // Verify that the number of orders for the buyer
    // is one less than before.
    orders = buyer.getRelObjs("orders");
    if(orders.size( )!= origCnt - 1)
        System.out.println("You will never see this.");
}
```

Step 614 executes by returning to POF 120 after the related objects have been retrieved according to step 602, or synchronizing is complete according to step 612.

Figure 7:
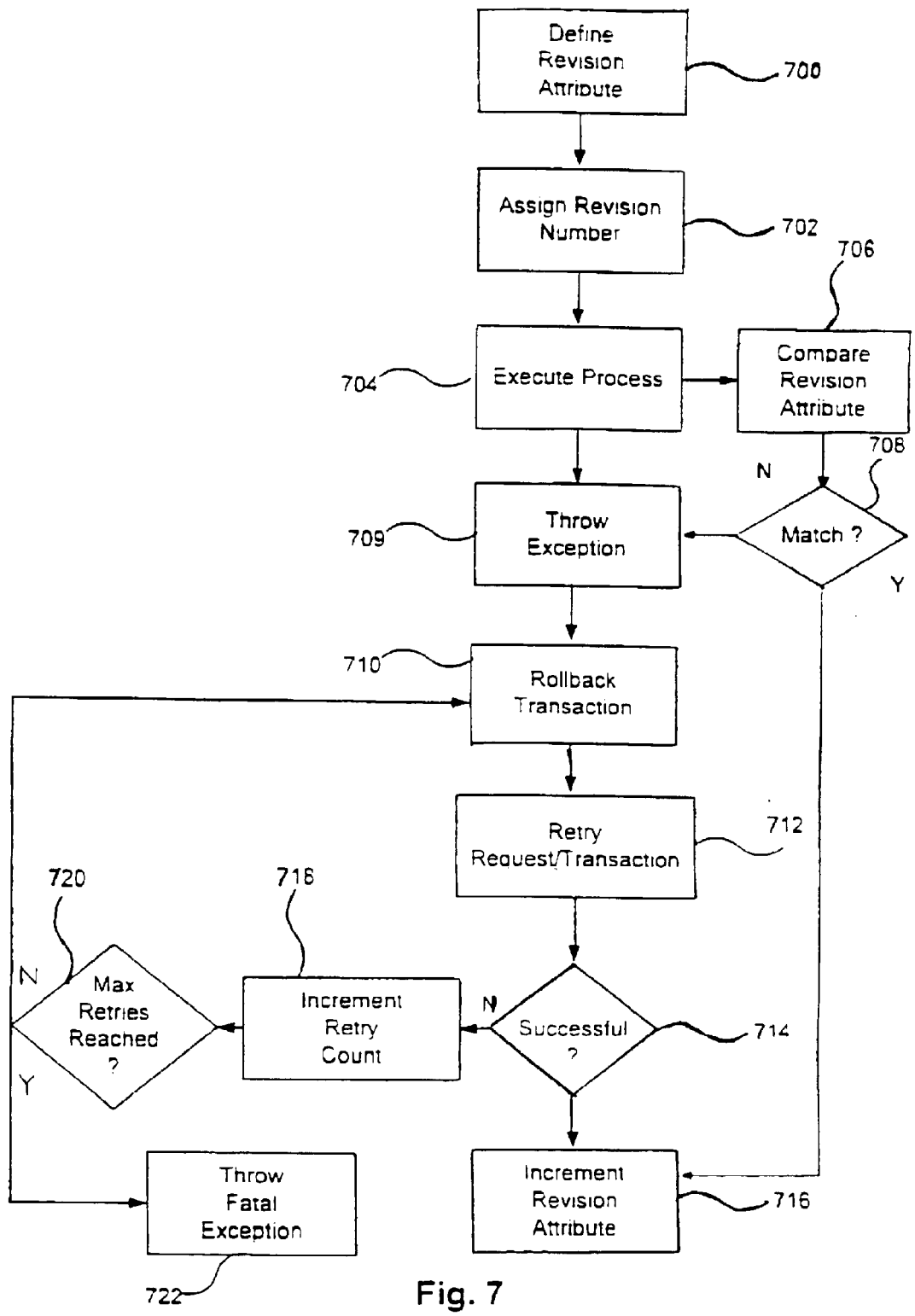
FIG. 7 illustrates a flowchart for stale data checking in accordance with an embodiment of the present invention.

FIG. 7 depicts a flowchart for stale data checking in accordance with an embodiment of the present invention. Stale data checking may mitigate problems with concurrent access to objects by separate processes. Two forms of stale data problems may be detected. First, a stale write occurs when two processes attempt to update or remove the same object at the same time. Second, a stale read occurs when one process removes an object and another process attempts to read the same object.

Step 700 executes by defining a revision attribute in the object type specification to enable stale data checking. The revision attribute may have its value maintained automatically, and the application developer should not need to be aware of its existence. Moreover, the application developer should not need to change the revision attribute. Step 702 executes by assigning a revision number to the revision attribute. When objects are first created, the revision attribute may be assigned a value of 1. Upon each committed transaction wherein the object has been changed, the revision attribute value may be incremented by 1. Alternatively, the revision attribute may begin with any integer value, and incremented by an integer value. The disclosed embodiments are not meant to limit the values or increments of the revision attributes.

The revision attribute may be added to the object type for each schema of which the object type is composed. For example, it may be defined as:

"rev_attribute" Bool "true", or a data type Integer and specified in the schema section. The following example pseudo-code discloses the schema declaration for an object type with stale write checking enabled:

```
"Order" NTV {
    "schema_type" Str "jdbc",
    "table_name" Str "Order",
    "attributes" NTV {
        "revision" NTV {
            "data_element" Str "Integer", // Must be an 'Integer'
            "column_name" Str "revision",
            "required" Bool "true",
            "rev_attribute" Bool "true", // Use this attribute
            // for stale write
            // checking.
        },
        // Add other schema attributes here...
    },
}
```

The schema attribute also may be declared in the data object section of the data model 210, as disclosed by the following example pseudo-code:

```
"Order" NTV {
    "class_name" Str "Order",
    "attributes" NTV {
        "revision" NTV {
            "attr_name" Str "revision",
            "schemas" NTVArr [
                { "schema" Str "Order",
                  "schema_attr" Str "revision"
                }
            ]
        },
        // Add other attributes here...
    },
}
```

The subsequent steps of FIG. 7 disclose resolving stale data problems. The two stale data problems may be a stale write and a stale read. Step 704 executes by executing the process that attempts to do the update or remove. The executed process may seek to modify the object and should ensure the proper version of the object is available. Step 706 executes by comparing the revision number of the revision attribute with the assigned revision number of step 702. The current revision number is fetched from the object. Step 708 executes by determining whether the revision numbers match. If yes, then step 716 is executed. If no, then the stale data exception occurs. Step 709 executes by throwing an exception.

The following steps may be performed by the business object when the stale data exception occurs. Step 710 executes by rolling back the current transaction, as noted by the revision attribute. Step 712 executes by retrying the request or transaction. Thus, this exception may be handled in a different manner than other exceptions associated with the persistent object framework. Step 714 executes by determining whether the retry was successful in completing the request/transaction. If yes, then step 716 executes by incrementing the revision attribute to reflect the completed request/transaction. If no, then step 718 executes by incrementing a retry count. To ensure no deadlocking or tying up occurs on the application server, a retry count may be maintained. Step 720 executes by determining whether the maximum number of retries has been attempted. If no, then step 710 is executed and another retry attempted. If yes, then step 722 executes by throwing a fatal exception. Thus, after a specified number of retries, a fatal exception may be thrown to prevent tying up the application server because of a stale data read or write.

Figure 8:
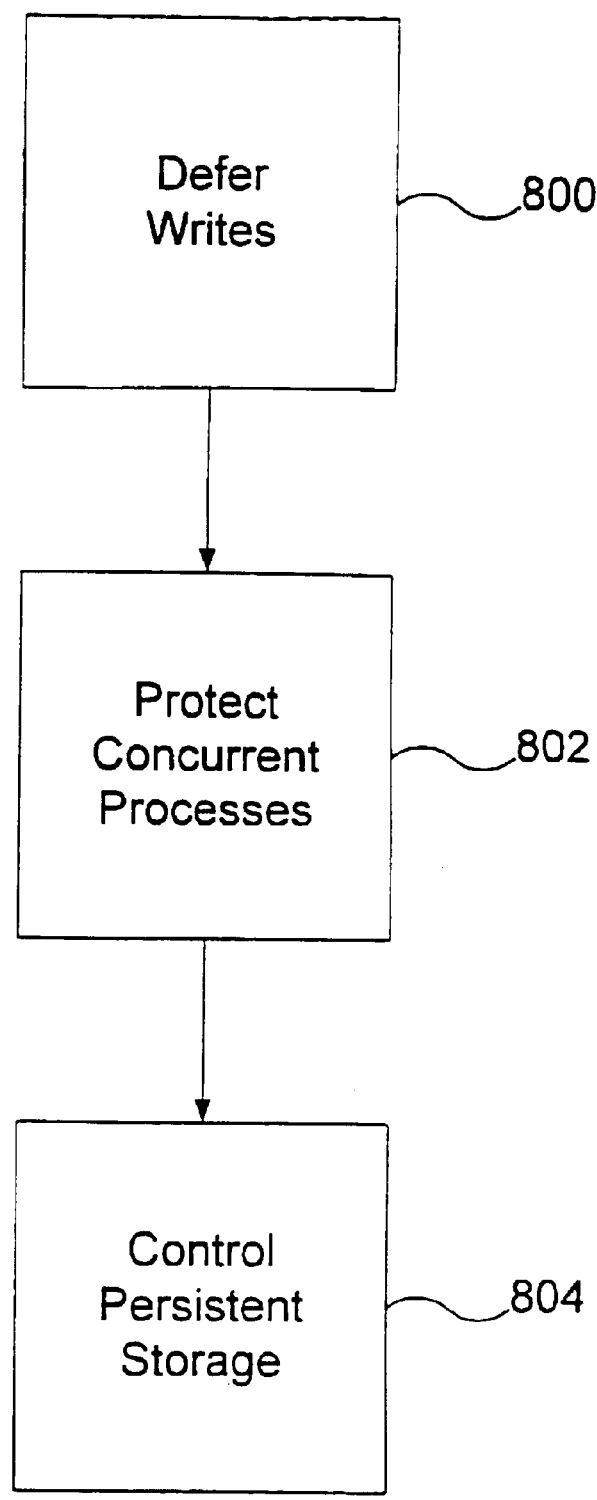
FIG. 8 illustrates a flowchart for persistent object framework maintenance functions in accordance with an embodiment of the present invention.

FIG. 8 depicts a flowchart for persistent object framework maintenance functions in accordance with an embodiment of the present invention. These functions may be executed by POF 120 during the course of managing objects for the applications, such as Java application 102. POF 120 performs these functions to update the object cache and optimize performance. Although the function are disclosed in a flowchart, the functions may not be dependent on each other and may be executed at any time.

Step 800 executes by deferring writes. Deferred writes cause all changes made in memory to be reflected in the persistent data source. Changes affecting persistent storage, such as creating new objects, changing objects and removing objects, are deferred until a transaction is committed, a flush method is invoked, or a query process is started. Changes are written when a query is started in order to guarantee that the query, or search, results are consistent with in-memory changes. Advantages of deferred writes may include not worrying about when changes are made persistent. This advantage may result in applications that have simpler designs, cleaner APIs, and more reusable code. Another advantage may be increased performance and user response times. Buffered writes may be facilitated by the deferred writing mechanism.

Step 802 executes by protecting concurrent processes. "Optimistic locking" may ensure that concurrent processes may not override each others' persistent changes. In order to facilitate this process, every schema that is to be protected may specify the revision attribute, as disclosed above. Whenever any objects are updated, the data source update statement may include a filter to ensure that the revision attribute value is the same as it was when the data was first read. If the update does not result in any changes, then the data has been changed or removed persistently by another application since the last time it was read. Therefore, an exception may be thrown.

Step 804 executes by controlling the persistent storage in certain instances. Normally, persistent storage may be handled automatically because most changes are made persistent when the transaction is committed. Rare occasions may exist where persistency needs to be controlled directly in order to avoid various database constraint violations. The following examples are given to demonstrate when control of the persistent storage may be needed.

First, a new object X1 is created. Another object X2 is created. Object X1 is changed to refer to object X2. Assuming the reference from object X1 to X2 is governed by a foreign key constraint, when the transaction commits, this constraint may be violated.

Further, a persistent object type name "X" may exist that has a unique constraint on an attribute named "A". The application queries for instances of object type "X" and gets two instances: X1 that has a value of "foo" for attribute "A" and X2 that has a value of "bar" for attribute "A". The application changes some attribute values in object X1, then the application changes attribute "A" in object X1 to "bar". When the transaction commits, a unique constraint violation may occur because object X1 may be updated first, and the new attribute value for "A" matches that for object X2.

In order to prevent these constraint violations, the flush method may be used to flush all outstanding changes to persistent storage. For example, the flush changes method may be invoked just before object X1 is changed to refer to object X2. Further, the flush changes method may be invoked just before attribute "A" in object X1 is changed to "bar".

It will be apparent to those skilled in the art that various modifications and variations can be made in the embodiments disclosed herein without departing from the spirit or scope of the invention. Thus, it is intended that the present invention covers the modifications and variations of the disclosed embodiments of the present invention provided they come within the scope of the appended claims and their equivalents.

What is claimed is:

1. A system for managing persistent objects for an application accessing data, wherein said persistent objects are stored in at least one data source, comprising:

a persistent object framework to provide data from and perform functions on said persistent objects in accordance with said application, wherein the persistent object framework is between the application and the data source and providing an interface for the application to query the data source; and a cached set of persistent objects within said persistent object framework and managed by the persistent object framework, the persistent objects being identified for use by said application and corresponding to said stored persistent objects.

2. The system of claim 1, wherein said application is a Java servlet.

3. The system of claim 1, wherein said functions include a function to create a persistent object, the creation function comprising caching the newly-created persistent object in the cached set of persistent objects and then, inserting the newly-created persistent object into the data source after a save transaction has been committed or a flush method has been invoked.

4. The system of claim 1, wherein said functions include a function to cache a persistent object.

5. The system of claim 1, wherein said functions include a function to update a persistent object, wherein the update function comprises deferring comprises writing to a persistent object in the data source that is deferred until a transaction is committed, a flush method is invoked, or a query process is started.

6. The system of claim 1, wherein said persistent object framework includes a set of data models corresponding to said stored persistent objects.

7. The system of claim 1, further comprising an additional data source and wherein said persistent object framework includes an object space to map said persistent objects to the at least one data source or the additional data source based on a type definition for each of the persistent objects.

8. A system for managing persistent objects correlating to an application, comprising:

means for mapping a persistent object stored within a data source with a persistent object framework coupled to said application;

means for identifying said persistent object stored in said data source as applicable to said application;

means for caching said persistent object within said persistent object framework; and means for creating a new persistent object according to a data model stored by the persistent object framework, the creating comprising caching the new persistent object in the persistent object cache and inserting the new persistent object in the data source after a save transaction has been committed or a flush method has been invoked.

9. A system for searching persistent objects stored in at least one data source, wherein an application accesses said persistent objects for data, comprising:

means for receiving a search query for a persistent object at a persistent object framework;

means for determining a query type for said search query, wherein said query type is selected from the group of query types consisting of a primary key, a handle, a unique key, a query filter, and a relationship between persistent objects;

when said query type is determined not to be a query filter, means for searching a cache within said persistent object framework for said persistent object according to said query type; and means for searching said data source when said persistent object is not within said cache.

10. A system for managing persistent objects within an application system, wherein said persistent objects are stored within a first data source and a second data source and said persistent objects provide data to an application, comprising:
   means for implementing a persistent object framework that caches said persistent objects correlating to said application comprising:
      means for creating said persistent objects;
      means for caching said persistent objects;
      means for accessing said persistent objects;
      means for updating said persistent objects;
      means for searching said persistent objects:
      means for deferring writes to said first and second data sources; and
      means for controlling persistent storage of said persistent objects; and
   means for retrieving said data from said first and second data sources when requested by said persistent object framework.

11. A method for managing persistent objects correlating to an application, comprising;
   mapping a persistent object stored within a data source with a persistent object framework coupled to said application;
   identifying said persistent object stored in said data source as applicable to said application;
   caching said persistent object within a cache managed by said persistent object framework; and
   with the persistent object framework, creating a new persistent object according to a data model stored by the persistent object framework, the creating comprising caching the new persistent object in the persistent object cache and inserting the new persistent object in the data source after a save transaction has been committed or a flush method has been invoked.

12. The method of claim 11, wherein said creating includes determining initial values for attributes within said data model.

13. The method of claim 11, wherein said creating includes updating a revision indicator within said data model.

14. The method of claim 11, wherein said creating includes determining a persistant object identify for said newly created persistent object.

15. The method of claim 11, wherein said creating includes defining subtypes for said newly created persistent object.

16. The method of claim 11, further comprising saving said persistent object by said persistent object framework.

17. The method of claim 11, further comprising accessing said persistent object by said persistent object framework.

18. The method of claim 11, further comprising updating said persistent object by said persistent object framework.

19. The method of claim 11, further comprising deleting said persistent object by said persistent object framework.

20. A method for searching persistent objects stored in at least one data source, wherein an application accesses said persistent objects for data, comprising:
   receiving a search query for a persistent object at a persistent object framework;
   determining a query type for said search query, wherein said query type is selected from the group of query types consisting of a primary key, a handle, a unique key, a query filter, and a relationship between persistent objects;
   when said query type is determined not to be a query filter, searching a cache within said persistent object framework for said persistent object according to said query type; and
   searching said data source when said persistent object is not within said cache or when said query type is determined to be a query filter.

21. The method of claim 20, wherein said searching of said data source includes enabling a lazy load state.

22. The method of claim 21, further comprising determining whether said persistent object data is needed by said application.

23. The method of claim 20, further comprising discarding said search query.

24. A method for managing persistent objects within an application system, wherein said persistent objects are stored within a first data source and a second data source and said persistent objects provide data to an application, comprising:
   implementing a persistent object framework that caches said persistent objects correlating to said application by:
      creating said persistent objects;
      caching said persistent objects;
      accessing said persistent objects;
      updating said persistent objects;
      searching said persistent objects;
      deferring writes to said first and second data sources; and
      controlling persistent storage of said persistent objects; and
   retrieving said data from said first and second data sources when requested by said persistent object framework.

25. A computer program product comprising a computer useable medium having computer readable code embodied therein for managing persistent objects correlating to an application, the computer program product adapted when run on a computer to effect steps, including:
   mapping a persistent object stored within a data source with a persistent object framework coupled to said application;
   identifying said persistent object stored in said data source as applicable to said application;
   caching said persistent object within said persistent object framework; and
   creating a new persistent object according to a data model stored by the persistent object framework, the creating comprising caching the new persistent object in the persistent object cache and inserting the new persistent object in the data source after a save transaction has been committed or a flush method has been invoked.

26. A computer program product comprising a computer useable medium having computer readable code embodied therein for searching persistent objects stored in at least one data source, wherein an application accesses said persistent objects for data, the computer program product adapted when run on a computer to effect steps, including:
   receiving a search query for a persistent object at a persistent object framework;
   determining a query type for said search query, wherein said query type is selected from the group of query types consisting of a primary key, a handle, a unique key, a query filter, and a relationship between persistent objects;
   when said query type is determined not to be a query filter, searching a cache within said persistent object framework for said persistent object according to said query type; and searching said data source when said persistent object is not within said cache.

27. A computer program product comprising a computer useable medium having computer readable code embodied therein for managing persistent objects within an application system, wherein said persistent objects are stored within a first data source and a second data source and said persistent objects provide data to an application, the computer program product adapted when run on a computer to effect steps, including:

implementing a persistent object framework that caches said persistent objects correlating to said application comprising:

creating said persistent objects;
        caching said persistent objects;
        accessing said persistent objects;
        updating said persistent objects;
        searching said persistent objects;
        deferring writes to said first and second data sources; and
        controlling persistent storage of said persistent objects; and retrieving said data from said first and second data sources when requested by said persistent object framework.

\* \* \* \* \*